(12) United States Patent
Maali

(10) Patent No.: US 8,599,261 B1
(45) Date of Patent: Dec. 3, 2013

(54) VISION-BASED CAR COUNTING FOR MULTI-STORY CARPARKS

(71) Applicant: PureTech Systems Inc., Phoenix, AZ (US)

(72) Inventor: Fereydoun Maali, Scottsdale, AZ (US)

(73) Assignee: PureTech Systems, Inc., Phoenix, AZ (US)

( * ) Notice: Subject to any disclaimer, the term of this patent is extended or adjusted under 35 U.S.C. 154(b) by 0 days.

(21) Appl. No.: 13/681,717

(22) Filed: Nov. 20, 2012

Related U.S. Application Data

(62) Division of application No. 12/586,325, filed on Sep. 21, 2009, now Pat. No. 8,339,454.

(60) Provisional application No. 61/192,525, filed on Sep. 20, 2008.

(51) Int. Cl.
*H04N 7/18* (2006.01)

(52) U.S. Cl.
USPC ........................................................ 348/149

(58) Field of Classification Search
USPC ........................................................ 348/149
See application file for complete search history.

(56) References Cited

PUBLICATIONS

Ming-Yee Chiu, et al., An embedded Real-time Vision System for 24-hour Indoor/Outdoor Car-Counting Applications, Proceedings of the 17th International Conference on Pattern Recognition (ICPR'04), pp. 338-341.
Andrea Prati, et al., Detecting Moving Shadows: Algorithms and Evaluation, IEEE Transactions on Pattern Analysis and Machine Intelligence, Jul. 2003, pp. 918-923, vol. 25, No. 7.
Chris Stauffer, et al., Learning Patterns of Activity Using Real-Time Tracking, IEEE Transactions on Pattern Analysis and Machine Intelligence, Aug. 2000, pp. 747-757, vol. 22, No. 8.

*Primary Examiner* — Yves Dalencourt
(74) *Attorney, Agent, or Firm* — Thomas W. Galvani, P.C.; Thomas W. Galvani

(57) ABSTRACT

Method and apparatus for counting vehicles at entrances, exits and transition zones of multi-story carparks, including particularly where the ceiling heights can be just marginally higher than the tallest expected vehicle, with a view to determine the carpark occupancy at different carpark levels by counting passing vehicles using a vision-based car counting system without relying on viewing test patterns or employing a blocking beam scheme and yet tolerating vehicles transgressing partially or fully into the wrong lane of a two-lane two-way road while ignoring vehicles moving opposite to the expected direction. Without imposing additional constraints to ambient carpark illumination, the methodology copes with highly specular vehicle surfaces, ignores non-vehicular objects and detects moving cast shadow or highlight, and adapts to daily and seasonal scene changes, and yet estimates vehicle speed.

14 Claims, 19 Drawing Sheets

Principal Processing Stages

Principal Processing Stages

Functional block diagram of rectangular monitor strip definition and its mapping from object space onto image space along with those of sliding apertures within it.

FIG. 7A Directional gradient processing

FIG. 7B Pixel-based background modeling & foreground image derivation

Aperture processing

Permissible state transitions in
Column-Sum (CS) processing

Requisites of inter-state and self transitions along with operations performed in any given state during Column-Sum (CS) processing Permissible state transitions in Row-Sum (RS) processing Requisites of inter-state and self transitions along with operations performed in any given state during Row-Sum (RS) processing

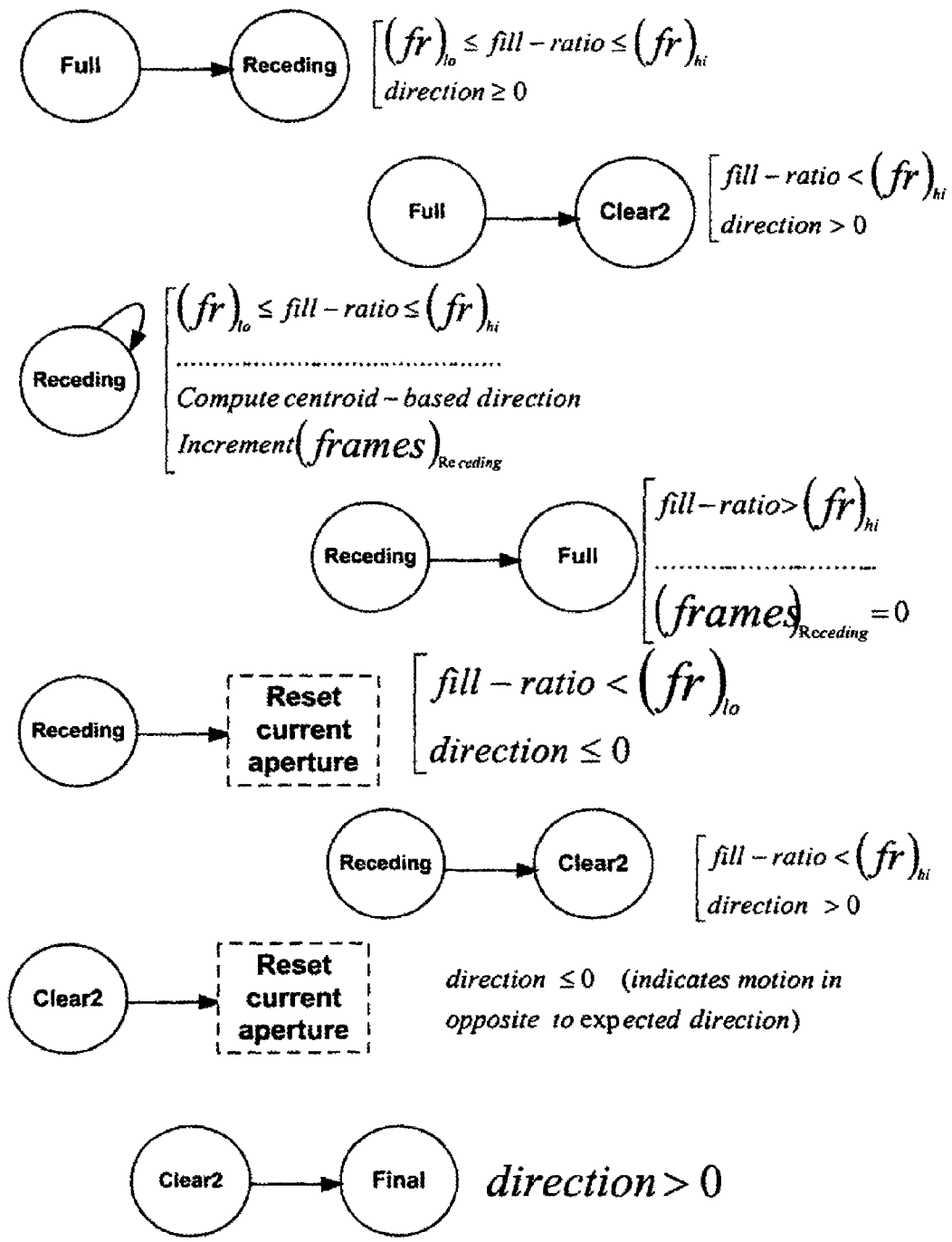
FIG. 10A
(continued from previous page)
Requisites of inter-state and self transitions along with operations performed in any given state during Row-Sum (RS) processing

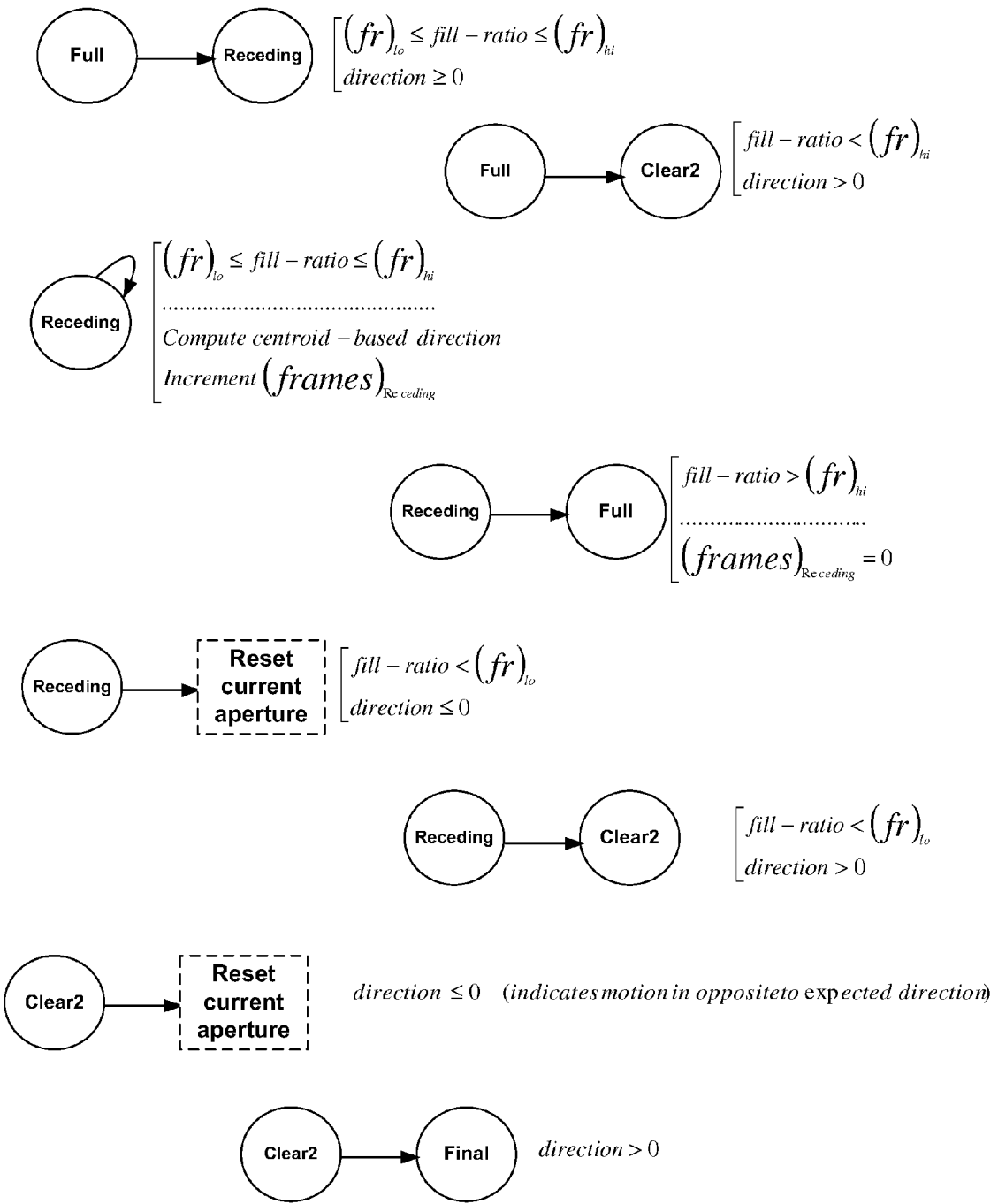
FIG. 10A (continued from previous page)
Requisites of inter-state and self transitions along with operations performed in any given state during Row-Sum (RS) processing Functional diagram of Point-Wise Coordinate-Insensitive moving cast Shadow-Highlight Detector (PWCISHD)

Functional diagram of Point-Wise Coordinate-Sensitive moving cast Shadow-Highlight Detector (PWCSSHD)

Steps in establishing threshold for use in identifying the subset of points that make up the mask to be used for shift computation between various image pairs Steps in establishing the threshold to be used in selecting the subset of points for computing shift between various image pairs Steps of computing the displacement between the current and prior gradient orientation image pair along with their respective masks

VISION-BASED CAR COUNTING FOR MULTI-STORY CARPARKS

CROSS REFERENCE TO RELATED APPLICATIONS

This application is a divisional of currently-pending U.S. application Ser. No. 12/586,325, filed Sep. 21, 2009, which is a non-provisional application claiming the benefit of U.S. Provisional Application No. 61/192,525, both of which are hereby incorporated by reference.

REFERENCES

Ming-Yee Chiu et al, "An Embedded Real-time Vision System for 24-hour Indoor/Outdoor", Proceedings of the 17$^{th}$ International Conference on Pattern Recognition" (ICPR04), pp. 338-341.

Andrea Prati et al, "Detecting moving shadows: algorithms and evaluation", IEEE Transactions on Pattern Analysis and Machine Intelligence, vol. 25, No. 7, July 2003

Stauffer et al, "Learning patterns of activity using real-time tracking". IEEE Transactions on Pattern Analysis and Machine Intelligence, vol. 22 No. 8, 2000.

FIELD OF INVENTION

The invention is related to the fields of image processing and industrial vision in general and vision-based object counting in particular.

BACKGROUND OF THE INVENTION

The present invention relates to automatic counting of passing vehicles through the use of video cameras. Throughout this disclosure the words vehicle and car are used interchangeably and are intended to encompass cars as well as trucks of various classes expected in carpark facilities.

Having a notion of occupancy at different levels and zones in multi-story carparks is becoming increasingly desirable for various reasons in many high traffic carparks such as those in airports, sport stadiums, city centers and major malls. Such information can in turn be used to direct drivers more efficiently to unsaturated levels and zones and, in turn, contribute to the carpark throughput. Many other reasons such as fuel consumption, decreasing pollution, or avoiding traffic jams can additionally be cited as benefits of routing drivers more efficiently to empty parking spaces.

A salient characteristic of many multi-story carparks is low ceiling heights compared to the permissible vehicle height. A 7.5 ft story-height where the maximum permissible vehicle height is close to 7 ft is not unprecedented. This application presents many challenges when it comes to isolating the imaged objects from the background and each other—namely, establishing background, foreground and performing image segmentation as well as coping with moving cast shadow and highlights and illumination changes among others.

Use of vision systems for car counting in general traffic and carparks is not unprecedented. For example, Ming-Yee Chiu et al, describe a system entitled "An Embedded Real-time Vision System for 24-hour Indoor/Outdoor", in the Proceedings of the 17$^{th}$ International Conference on Pattern Recognition" (ICPR04), pp. 338-341. They deploy two camera-test pattern pairs each for one direction, each dedicated to counting cars and trucks in one direction of the two-way roadway. In such arrangement the camera is placed high up on one side of the road while its pairing test pattern sits low, close to the ground on the opposite side of the road. They use the blocking light-beam principle to trigger car counting in the far lane. The test pattern is an elaborate black-and-white radial LED. The test pattern and the far-side vehicle can be obscured by a nearside vehicle particularly if the ceiling height is insufficient, as is often the case in multi-story carparks. On the contrary, the present invention does not depend on viewing a test pattern nor is it hampered by the presence of obscuring near-side vehicles, to be expected in 2-way traffic, as each camera is concerned with counting the nearside vehicle and further tolerates vehicle transgression fully or partially into the wrong lane.

The system relies only on grayscale imagery and does not exploit color. From an image processing viewpoint, the methodology of the present invention makes the following contributions:

9) It introduces a novel pixel-based adaptive background model that always yields a prevailing background, a necessity in the processing sequence of the present invention. As a result, the background model in essence remains unimodal, while supporting two contending distributions at all time. This is markedly different from a bimodal model in whose case much like any multimodal background model all modes co-exist at all time.

10) The above is accompanied by a novel pixel updating scheme.

11) A pixel classification scheme that rests on an adaptive intensity threshold is introduced for assigning the respective pixel coordinate into background or foreground.

12) It resolves the critical step of image segmentation i.e. isolating the passing vehicles—or in general objects—from the background and each other in the spatiotemporal space only in the directions of concern and only to the extent necessary, as opposed to pursing it in a full-fledged manner in the spatial space or spatiotemporal space, yet without resort to any blocking beam scheme including use of test patterns to mark separation of the passing objects; in effect it circumvents the difficult problem of segmenting of objects that may appear to be touching or overlapping;

13) It views the scene through a slit-like monitor zone—i.e. a fraction of the entire image—and consequently reduces the computational load significantly;

14) It does not impose any additional constrain to ambient lighting of multi-story carparks including coping exposure to sunlight;

15) It introduces two novel cast shadow/highlight detectors;

16) It introduces a multitude of motion detection and speed estimation schemes.

OBJECTS AND SUMMARY OF THE INVENTION

A salient characteristic of many multi-story carparks is their low ceiling compared with the permissible vehicles heights. A 7.5 ft story-height where the maximum permissible vehicle height is close to 7 ft is not uncommon. Moreover, this application presents many challenges that among others require coping with: highly specular vehicle surfaces, daily and seasonal changes of ambient illumination, moving cast shadow and highlight in general and from other vehicles, along with a requirement to discount non-vehicular objects including pedestrians. Additionally, there is often a requirement to estimate vehicle speed.

The present invention solves the floor (or zonal) occupancy level problem through counting vehicles as they transit across the zonal boundaries of multi-story carparks. The same solution also addresses the problem of counting vehicles at entrances or exits of such carparks.

Each car counting unit comprises a video camera, a digitizer, a vision processor which in turn communicates its instantaneous result, namely an instance of a vehicle count to the carpark server, responsible for maintaining the occupancy levels at granularity of its choice. The system generic configuration may assume different forms, for example, the camera may be and IP network camera performing on-board digitization and encoding and transmitting the encoded video stream through an internet connection to the vision processor that may itself assume different configuration ranging from a general purpose computers to a DSP-based controllers or controllers in general.

Each car counting unit is intended to count vehicles in a given direction.

It is an object of the present invention to:
count passing cars in a given direction even when they partially or fully transgress into the wrong lane of a two-way two-lane road;
count cars without resort to test patterns or painting or modifying the roadway including its appearance;
cope with the ambient lighting that is available in carparks plus variations due to sunlight or reflection of sunlight from stationary or moving surfaces including the target or adjacent vehicles;
cope with moving cast shadow or highlight brought about by moving vehicles in the adjacent lane or close by objects;
not count pedestrians and generally non-vehicular objects for example a pram or suitcase;
not count vehicles traveling in the opposite direction;
estimate the length of the passing objects; and
estimate the speed of the passing vehicles.

BRIEF DESCRIPTION OF THE DRAWING

FIG. 4A also depicts side camera 20, which monitors the scene.

DETAILED DESCRIPTION OF THE PREFERRED EMBODIMENT

The present invention is described in context of several exemplary embodiments.

Example Hardware

Figure 1:
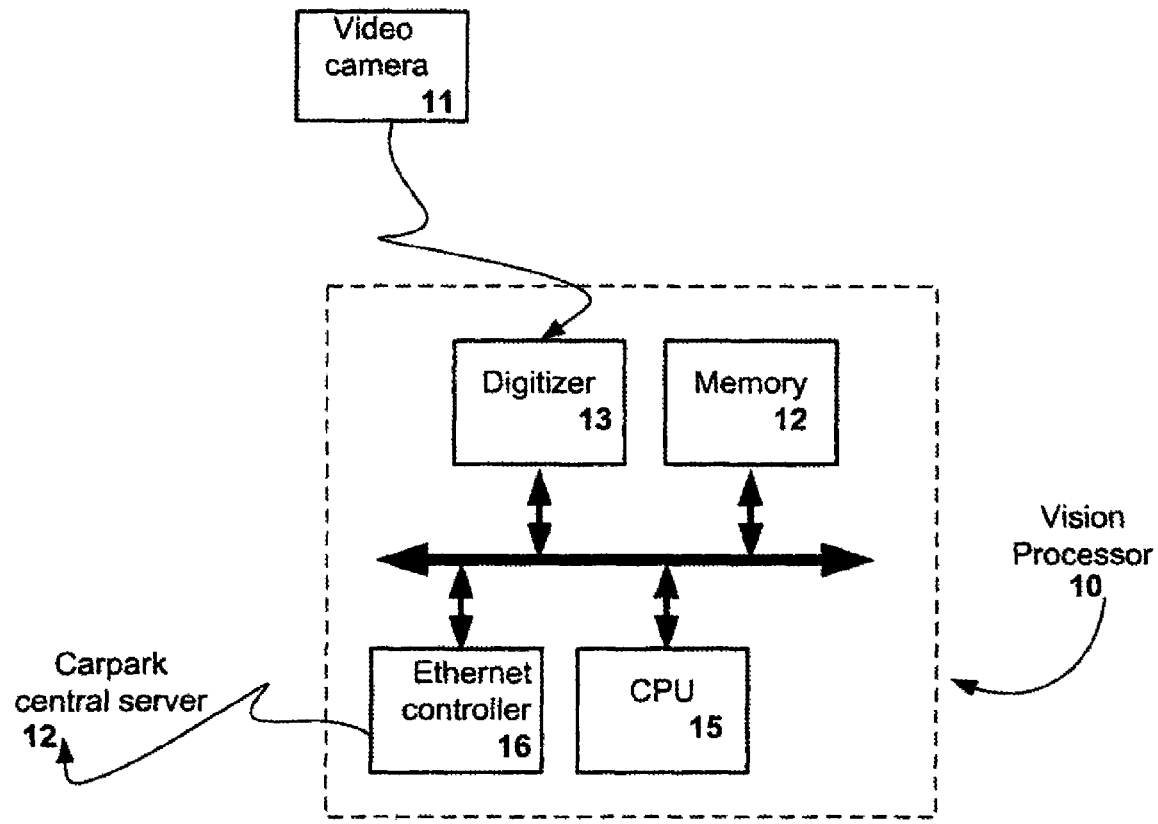
FIG. 1 shows, the generic composition of one possible vision-based car counting system as intended in the present invention. It comprises a video camera 11, a vision processor 10, which is connected via a communication link 12 to the carpark central server through which it reports every instance of a passing vehicle in the direction of concern while ignoring those in the opposite direction as well as non-vehicular objects. Ultimately, each count finds its way into the carpark database. The video camera may be analog or digital or a hybrid camera. When the camera is analog, the vision processor acquires the image sequence through a digitizer 13 which in turn dumps the image data into the address space of the vision processor. The minimal system is a single channel system with each channel being identified with a video camera, as shown in the FIG. 1. A car counting system may support several channels with each channel handling car count in one direction.

FIG. 1 shows the generic composition of a vision-based car counting system as intended in the present invention, however, for explanation purposes the simplest and minimal configuration has been chosen, as will become apparent shortly. It comprises a video camera 11, a vision processor 10, which is connected via a communication link to the carpark central server 12 through which it reports every instance of a passing vehicle in the direction of concern while ignoring those in the opposite direction. Ultimately, each count finds its way into the carpark database 12. The video camera may be an analog, digital or a hybrid camera. When the camera is analog, the vision processor 10 as shown in FIG. 1 acquires the image sequence through a digitizer 13 which in turn dumps the image data into the address space of the vision processor 10. The vision processor 10 may be realized through a central server supporting one or a multitude of channels with each channel being identified with a video camera or more generally video feed as long as the video is acquired through a camera that is retrofitted with appropriate optics and placed and posed to monitor its scene in a certain way—to be addressed. The vision processor 10 may equally be realized through an embedded video edge device, for example, with one or two channels. It will be apparent to one skilled in the art that the supporting system, as described so far and depicted in FIG. 1, may assume a variety of configurations without departing from the spirit and scope of the present invention.

Figure 2A:
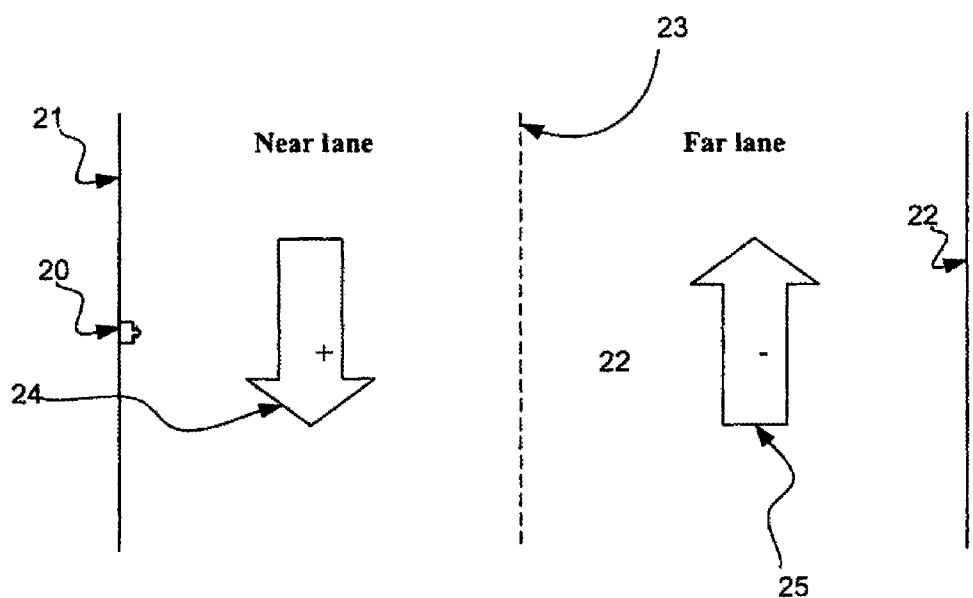
FIG. 2A depicts the plan view of a 2-way roadway at a transition zone of a multi-story carpark with vehicles passing simultaneously in both direction. The vertical lines 21 and 22 represent the extremities of the two-way roadway. The video camera 20, which is intended to monitor the entire width of the roadway, is sited at the ceiling just above or proximity of road side edge 21. The vertical dashed line 23 depicts a virtual line marking the middle of the two way roadway and hence dividing the road into a near lane and far lane with respect to the video camera 20. The arrow 24 represents a vehicle passing in the counting direction while the arrow 25 represents a vehicle in the reverse direction, which should not affect the count as far as images acquired through video camera 20 is concerned.

FIG. 2A shows the plan view of a 2-way roadway at a transition zone of a multi-story carpark where the scene is being imaged by the same side camera 20 of FIG. 1A. The minimal car counting system hereafter also referred to as a car counting unit is intended to count passing vehicles in a tow-way two-lane roadway in the expected direction while ignoring those in the opposite direction and ignoring all non-vehicular objects, for example, pedestrians in both directions.

Figure 2B:
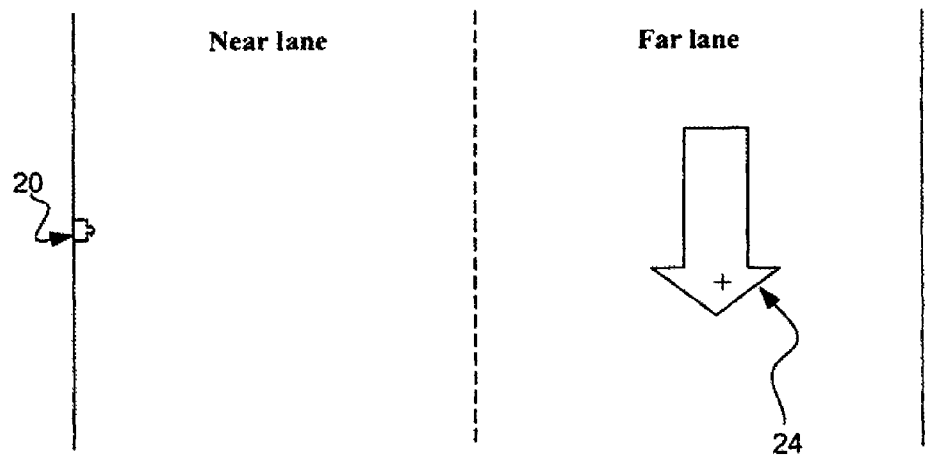
FIG. 2B again depicts the plan view of the same 2-way roadway as in FIG. 2A, but in this instance a single vehicle is shown that is progressing along the expected (i.e. counting) direction while having transgressed into the wrong lane. The scene is being monitored by the same side video camera 20 as in FIG. 2A. The passing vehicle will still be counted, although in the wrong lane, as long as is not obscured or occluded by another.

FIG. 2B again shows the plan view of a 2-way roadway at a transition zone of a multi-story carpark. Although, the vehicle is progressing in the expected direction, however, it has transgressed into the wrong lane of the depicted two-way road. The scene is being monitored by the same side camera 20, as shown in FIG. 2A. FIG. 2B is intended to reaffirm that the car shall still be counted even when fully transgressed into the wrong lane. The underlying assumption for the vehicle to be counted is that it must not be obscured or occluded by another. The system must also not count pedestrian and generally non-vehicular objects moving in either direction.

Figure 3:
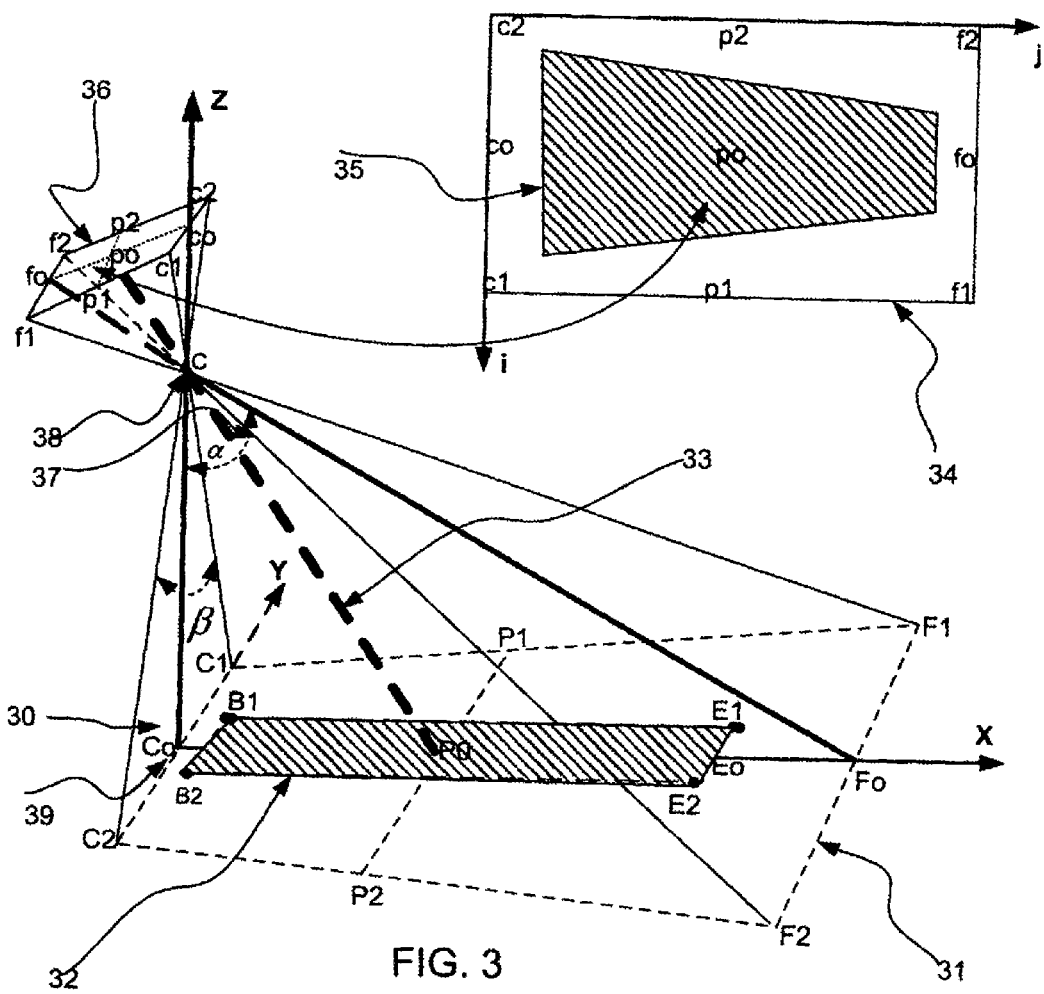
FIG. 3 illustrates the imaging geometry. It shows the camera frustum 31 at the road plane and the rectangular strip (also referred to as the rectangular monitor strip) 32, which constitutes the part of the scene that matters. It is noteworthy that the camera located at 38 (i.e. point C) is so aligned that one of the outer faces of the camera's pyramidal view volume 30, specified through vertices C, C1, C2 remains perpendicular to the road surface. A right-handed Cartesian coordinate system is associated with the scene and its origin 39 is located close to the road edge 21 where a perpendicular dropped from camera point 38 meets the road plane—also shown as point Co. The X-axis of this right-handed coordinate system runs across the width of the road while its Y-axis runs parallel to the road while its Z-axis protrudes out of the road surface. It should be noted that the rectangle monitor strip is symmetric about the X-axis. The camera's retina 36 and its associated image 34 are also depicted in the figure. The image coordinate system, as shown in the figure, is a left-handed coordinate system with its origin at the top left-hand corner of the image 34. The figure shows the geometry relating the scene to its image—assuming first order paraxial optics. Moreover, it depicts the rectangular monitor zone 32 once imaged onto camera space 35. As evident from said depiction the rectangular monitor zone 32 in object space is imaged as symmetric trapezoid hereafter referred to as the trapezoidal monitor zone 35 in image space. A symmetric trapezoid has two parallel sides and two equal sides. The dashed line 33 depicts the principal ray of the camera while point C specifies the camera location 38 in 3-space. The scene is imaged through a rectilinear lens. The lateral field of view 37 of the imaging system is depicted as angle $\alpha$.

FIG. 3 depicts the imaging geometry. It shows the camera frustum and the rectangular strip, which constitutes the part of the scene that matters. It is noteworthy that one of the outer faces of the camera pyramidal view volume, specified through vertices C, C1, C2 must remain perpendicular to the road surface. A right-handed Cartesian coordinate system is associated with the scene. The origin is located close to the road edge and the Y-axis runs parallel to the road. This figure shows the geometry relating the scene and its image.

Monitored Zone and its Projection onto Image Space

The frustum of the camera at the plane of the road surface is depicted in FIG. 3. As evident from FIG. 3 and FIG. 4A, a rectangular region from the center of the road is designated as the zone to be monitored.

Figure 4A:
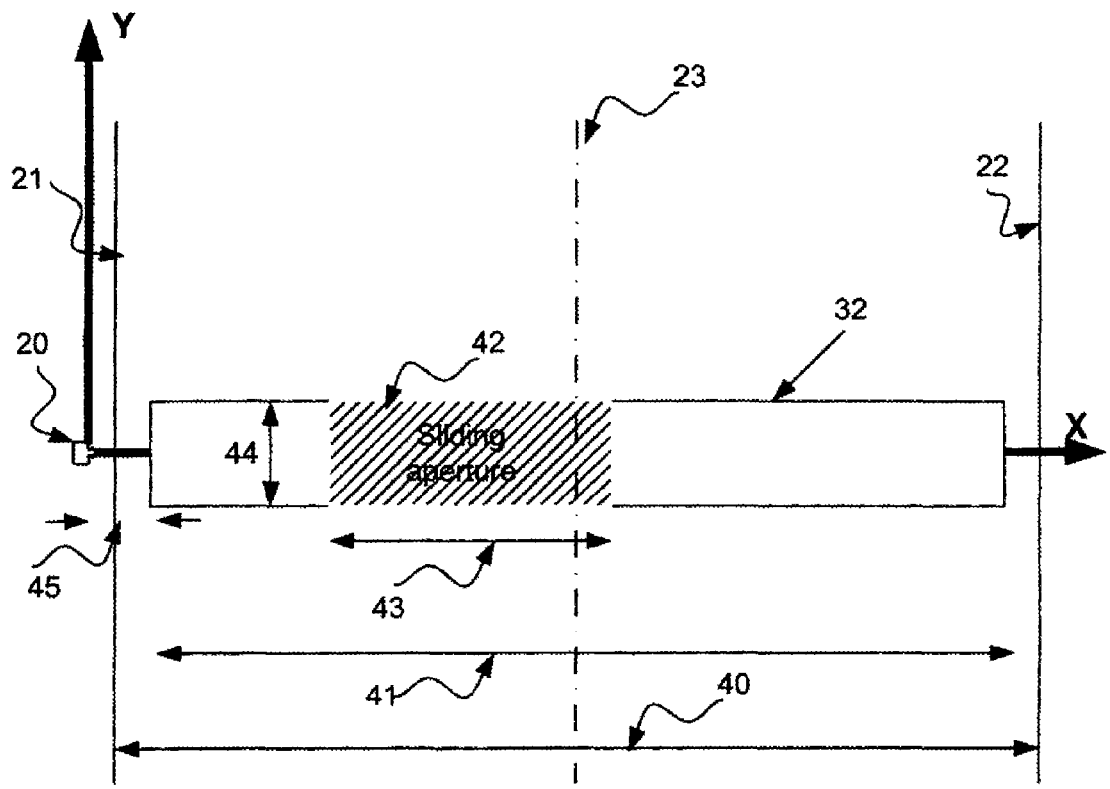
FIG. 4A illustrates the plan view of the 2-sided road of FIGS. 1A and 1B, the rectangular monitor strip 32 and the sliding aperture 45 within said rectangular monitor strip. Moreover, it specifies the parameters, which define the size and placement of the rectangular monitor strip 32 and the sliding aperture 42 within it. The figure further illustrates some of the parameters that are at user's disposal to configure the monitor zone and the sliding aperture within it: user defined road width 41 in contrast to the actual road width 40; the rectangular monitor height 44 which together with the aforementioned user specified monitor height 44 define the extent of said monitor strip 32; the user defined margin 45 parameter which affects the placement of said rectangular monitor strip from the origin of the coordinate system 39; the sliding aperture width 43. The sliding aperture in the object space is a rectangular window that slides from the camera end of said rectangular monitor zone 32 to its far end at user-defined pace.
Figure 4B:
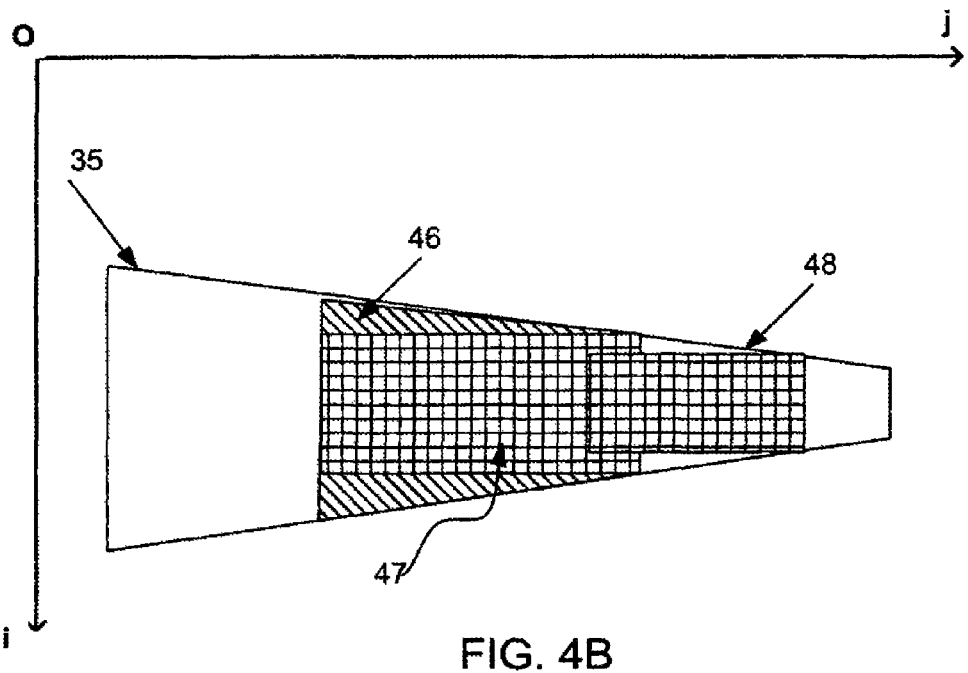
FIG. 4B shows the rectangular monitor strip 32 along with its sliding aperture when mapped onto image space. As evident the rectangular monitor strip in the object space is mapped as the trapezoidal monitor zone 35 in image space. The figure further depicts how instances of the object space rectangular sliding apertures are mapped onto corresponding trapezoids 46 in image space, and in turn how the expected trapezoidal apertures are approximated by their inscribed orthogonal rectangles 47. The figure further shows another instance of the rectangular sliding aperture in object space after having been mapped onto image space first as trapezoid and being approximated by its inscribed orthogonal rectangle 48.

The imaging geometry of FIG. 3 causes the rectangular monitor strip to be imaged as a trapezoid as depicted in FIG. 4B. Typically the rectangular monitor strip stretches across the road-width. The rectangular monitor strip is monitored through a moving (sliding) rectangular window (aperture), which advances sequentially from the sensor end of the rectangular monitor strip across the monitor strip, at a user defined pace, to the far end of the rectangular monitor strip.

FIG. 4B shows the trapezoidal monitor zone of FIG. 4A along with its sliding aperture after being mapped onto image space. The figure further shows how the expected trapezoidal sliding aperture in image space is approximated by a sliding rectangular aperture. Instances of said sliding image space rectangle or apertures are shown as 47 and 48.

Figure 5:
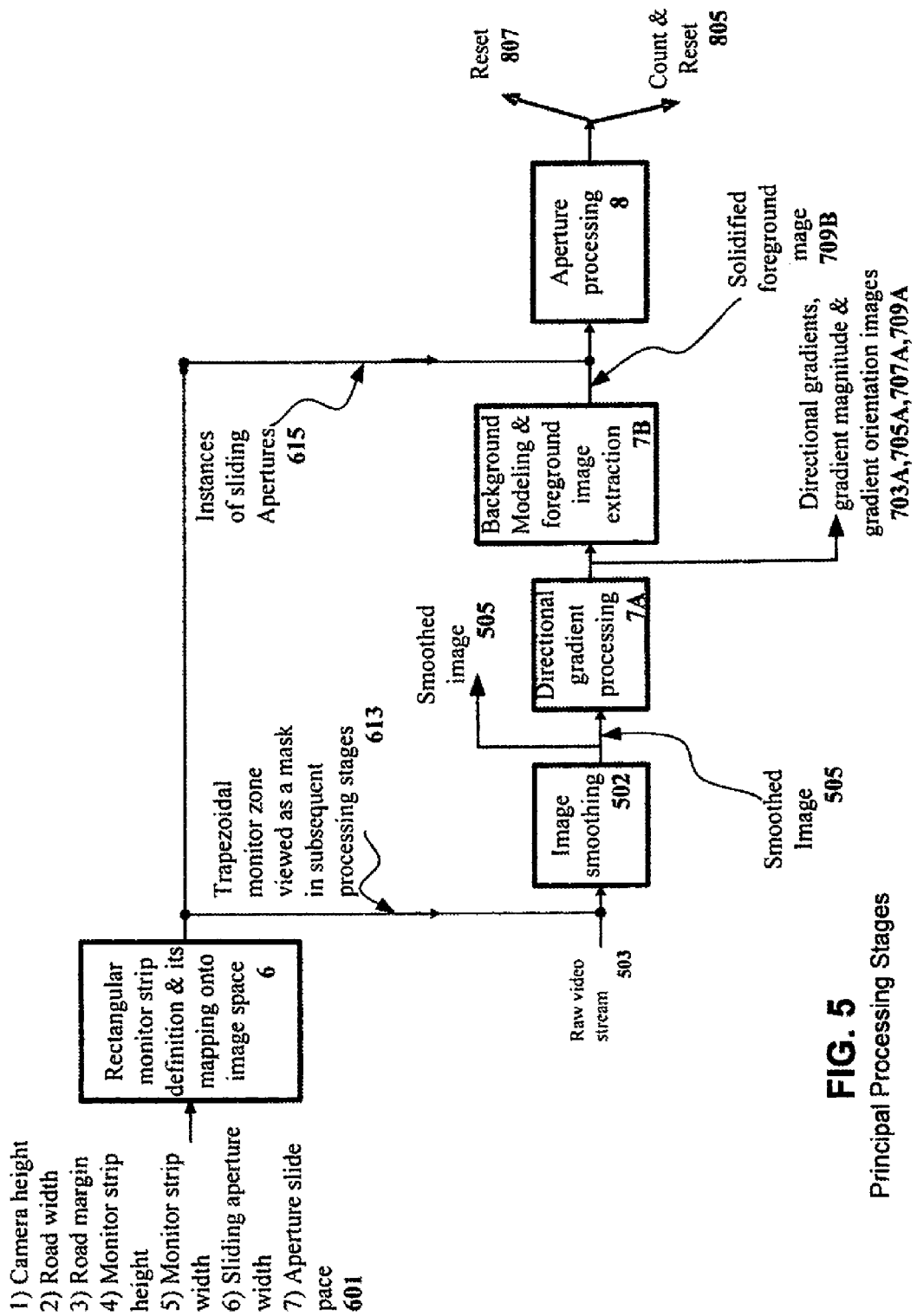
FIG. 5 depicts the principal processing stages of the entire methodology in context of a synoptic functional block diagram. In such depiction, generally, each functional block illustrated by a rectangle states the nature of action, or process, performed along with its temporal precedence over it connecting blocks. When pertinent, the inputs and outputs of the functional blocks are also specified through an arrow pointer. Functional blocks have generally been assigned an even number while their resulting outputs, or inputs, are assigned an odd number. Use has also been made of a triangular block as comparator—see for example 1414 and 1418 in FIG. 18. Use also has been made of switches which flip to one or another side based on the result of the preceding functional block or a comparison operation, for example 822 and 824 in FIG. 8. Use also has been made of logical-AND symbol as in 1020 in FIG. 10 which is intended to state both inputs must persist in order to proceed to the next step.

FIG. 5 depicts the principal processing stages of the entire methodology in context of a synoptic functional block diagram.

Figure 6:
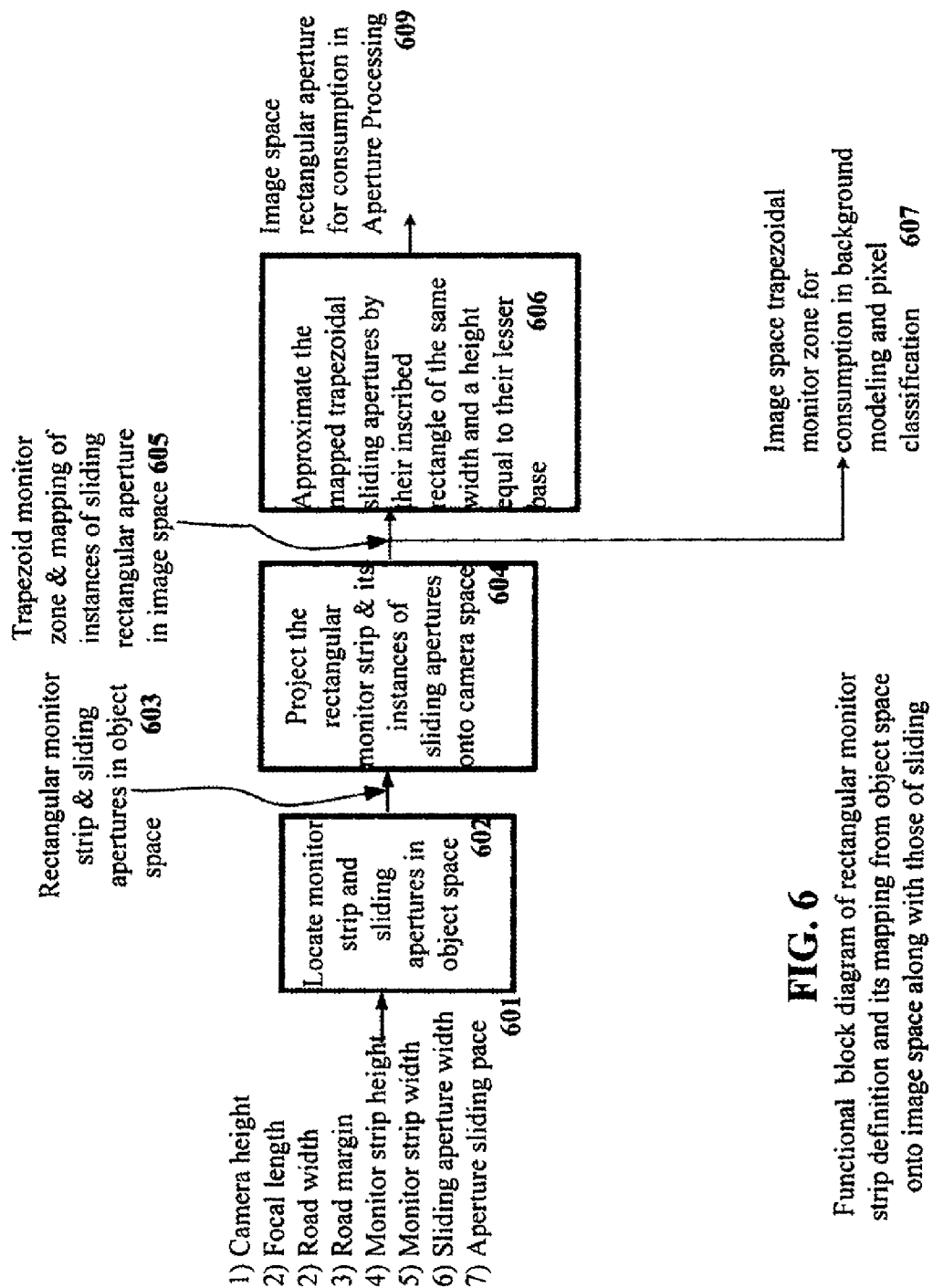
FIG. 6 depicts the steps involved in defining the monitor strip and its mapping onto image space including instances of its sliding aperture within the mapped monitor strip as it progress from the camera end of monitor zone to its far end. 601 specifies the parameters whether system related such as—the focal length or the camera height—and those defining the size and the placement of the rectangular monitor strip.

FIG. 6 illustrates the steps involved in defining the rectangular monitor strip and its mapping onto the image space along with instances of its sliding aperture. The input to this functional block diagram comprises: 1) the height above road surface that camera is sited; 2) the road width; 3) road margin—i.e. the horizontal distance from the perpendicular dropped from the camera to the road surface to the edge of the road; 4) Monitor strip height; 5) Monitor strip width; 6) sliding aperture width; 7) slide pace of the aperture; 8) focal length; and 9) the imager (retina) size.

Directional Gradient Processing

Figure 7:
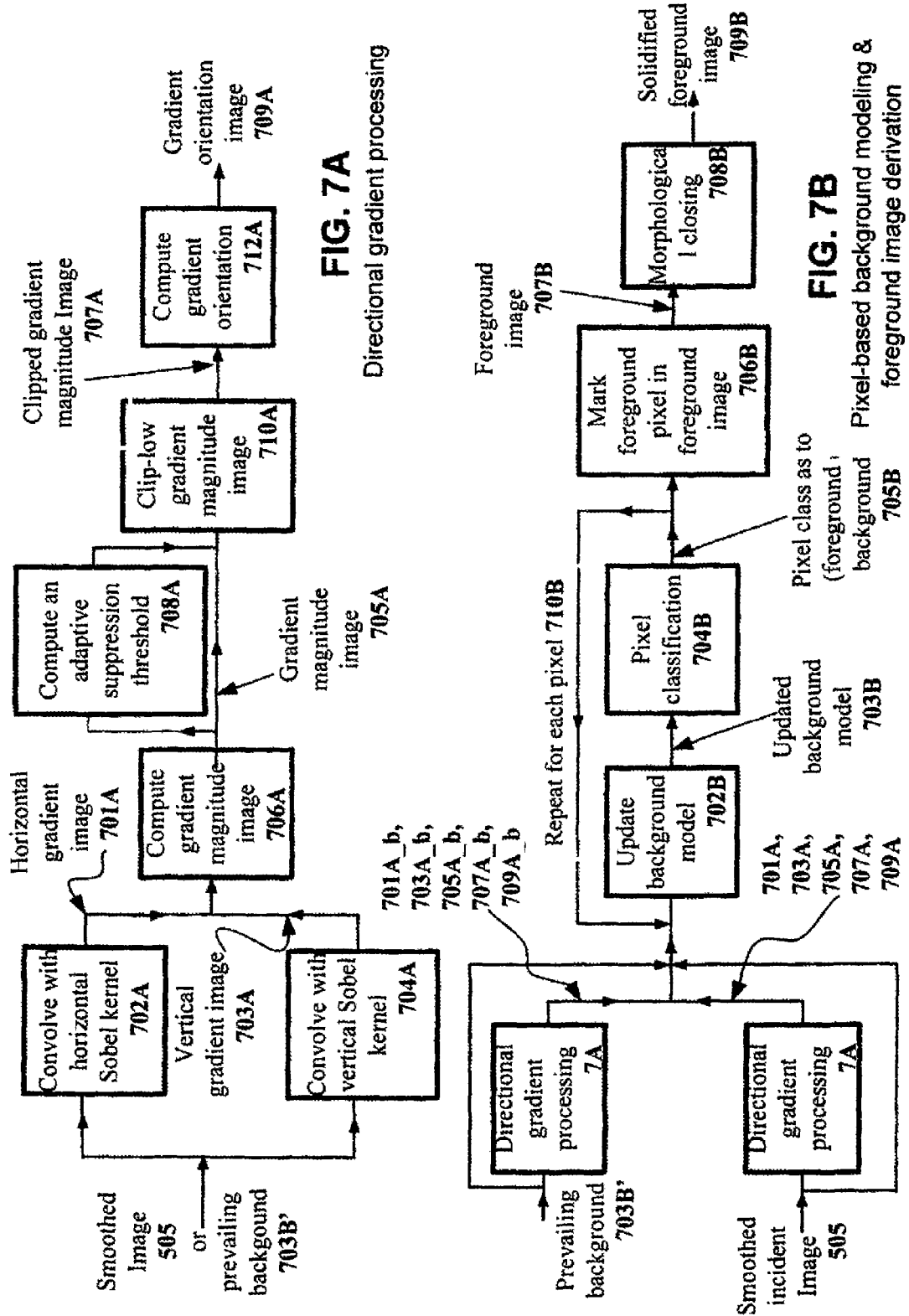
FIG. 7A depicts the steps involved in directional gradient processing which ultimately yields the gradient orientation image. One of its by products is the vertical gradient image which in turn is used to construct a mask—namely a binary image—for later use in determining the vehicle direction of motion and estimating the vehicle speed. The functional blocks of FIG. 7A are collectively viewed as "directional gradient processing" and are referred to as such or equally as "step 7A" for ease of reference.
FIG. 7B depicts the steps of pixel-based background modeling and pixel classification leading to derivation of the foreground image in the present invention. 710B illustrates a loop which depicts updating of the background model followed by classification for the pixel coordinate of concern into a foreground or a background pixel until the fate of all pixels are concluded. This depiction may suggest that such operation may only be carried out sequentially while the intention here is to convey that the background modeling step 702B and its accompanying pixel classification step 704B are invoked for all pixels independently as opposed to necessarily sequentially as such operation affords massive parallelism.

Referring to FIG. 7A, the gradient orientation image is computed, at the outset, by convolving each smoothed image—be it the incident smoothed image or the prevailing background, as shown in FIG. 7A—with the Sobel horizontal 702A and vertical 704A kernels. The convention adopted in gradient direction is with the direction being perpendicular to the edge itself and pointing from low to high gradient. Once the gradient magnitude, for an entire image region encompassing the trapezoidal monitor zone 613 is computed, it is subjected to a clip-low operation 710A at an adaptive suppression threshold which is computed at step 708A by:

12) Constructing a histogram of the gradient magnitude image, for the region of interest;

13) Deriving a stable maximum for said histogram in (1), above, by computing the median of the samples which fall within a top predefined percentage of the population;

14) Deriving a trimmed mean for said histogram by ignoring a bottom low and high top predefined percentages of the underlying samples of the population;

15) Deriving a threshold from the mean of thus derived stable maximum and trimmed mean in (2) and (3) above;

16) Selecting the greater of thus derived threshold in (4), above, and a user-defined noise floor as suppression threshold to be used in said clip low operation 710A.

All pixel coordinates be it background or in the incident frame whose gradient magnitude have been suppressed in this manner will remain deprived of gradient orientation and are flagged accordingly 712A. The operation sequence thus described yields the gradient orientation image 709A.

Background Modeling and Pixel Classification

Referring to step 7B in FIG. 5 and FIG. 7B, what is modeled is the temporal sequence of grayscales at each pixel coordinate of the video stream. Each such sequence is modeled through two contending Gaussian distributions. However, at any one time, only a single Gaussian prevails. The models are adaptive and one or the other is updated with arrival of each new frame, hence, permitting the pixel-based background models to evolve in order to account for gradual changes in the background, which are inevitable due to lighting and other changes.

The two Gaussian distributions continually contend to represent the background. These models are viewed as the primary (or active or prevailing) model and the secondary (or contending or alternate) model. Each contending model shall at all times be lurking in the wings waiting for an opportunity to replace its active counterpart. Such opportunity arises once the contending model can exhibit a smaller variance than that of the active model once it has iterated above a requisite minimum. Alternatively, such opportunity may also arise if the active model is found not to have been replenished by a new sample beyond a given interval.

The object of background modeling is to reveal the foreground pixels, and is achieved in two steps: 1) background model updating 702B; and 2) pixel classification 704B. It should be remembered that all processing, at this stage, is confined to the "Trapezoidal Monitor Zone 35" and its immediate periphery in Directional Gradient Processing 7A of FIG. 5".

Updating the Background Model

Referring to step 702 of FIG. 7B, the background is attained through recursive computation of the mean and standard deviation of the grayscale sequence at each pixel coordinates of the smoothed image sequence—namely the raw image sequence after being low-pass filtered 502, using a Gaussian Point Spread Function (PSF). The recursion formulas used are:

$$\mu_{n+1} = \frac{n}{n+1}\mu_n + \frac{1}{n+1}x_{n+1} \quad (1)$$

$$\sigma_{n+1} = \sqrt{\frac{n}{n+1}\eta_n + \frac{1}{n+1}y_{n+1} - \left(\frac{n}{n+1}\mu_n + \frac{1}{n+1}x_{n+1}\right)^2} \quad (2)$$

where $x$: grayscale of the pixel of concern $\mu$: mean[$x$]

$\sigma$: standard deviation of $x$ $n$: number of iterations $y$: $x^2$ $\eta$: mean[$y$]

with, $\eta_{n+1} = \frac{n}{n+1}\eta_n + \frac{1}{n+1}y_{n+1}$

The incident pixel updates the primary background if it deviates from it by no more than an admissible extent defined through an adaptive threshold. Said permissible deviation assumes different values based on gradient orientation differential, at a pixel coordinates, between that of the incident frame and that of the background. More specifically, when the incident image point and the background point exhibit conformity in gradient orientation, then the threshold is relaxed—i.e. it becomes easier to surmount, otherwise if they exhibit a vast difference then the threshold is made stringent—i.e. more difficult to meet, and if neither exhibit a gradient direction then only a mild—i.e. moderate-discrepancy in grayscale is demanded of the pixel for contributing to the background model. And all three levels in turn take into consideration the variance of background distribution at the pixel coordinates of concern. In this scheme the following relation holds:

relaxed<mild<stringent.

In the preferred embodiment, the primary background is made to have faded memory through imposing a user-defined ceiling on the number of samples, n. This will give a somewhat higher weight to fresher samples.

Pixels in the incident smooth image that cannot update the primary background then update the contending, or alternate, background. Similar statistics to the primary background are computed recursively for the alternate background.

Pixel Classification

Referring to Step 704B of FIG. 7B, The purpose of establishing an adaptive background model is to arrive at the foreground image—a binary image in which the foreground pixels are set and the background pixels are cleared. Here again, much like updating the background model, an adaptive threshold is computed. When the gradient direction of the background and the incident smoothed image conform, then a so called stringent, i.e. a relatively high intensity differential is demanded from the pixel to qualify as a foreground ground pixel. On the other hand if the gradient orientations are sufficiently discrepant then a relaxed threshold applies—i.e. a much lower intensity differential is demanded from the pixel. When either the incident frame or the background do not exhibit any gradient direction—by virtue of showing insufficient gradient magnitude—then a so called mild threshold is applied, i.e. a somewhat moderate intensity differential is expected at that pixel coordinates for being assigned to foreground. Again in this scheme relaxed<mild<stringent, and as before they are in turn derived from the variance of the prevailing background at the respective pixel coordinates.

Aperture Processing

Referring to step 8 in FIG. 5, aperture processing is where vehicles are detected, discriminated from non-vehicular objects (for example, pedestrians), their conformity to expected direction of movement is confirmed or negated and their speeds are estimated. Its significance is in enabling to circumvent the direct segmentation of foreground image sequence. Aperture processing conducts image segmentation in spatiotemporal space—only to the extent required for isolating objects from the background and from each other, yet it achieves it without the use of beam blockage or disruption of the line of sight to a test pattern as in prior art, nor it imposes additional lighting constraints to what is typically available in multi-story carparks. In short, through aperture processing the difficult problem of apparent touching and overlapping objects at times encountered in machine vision is circumvented.

Figure 8:
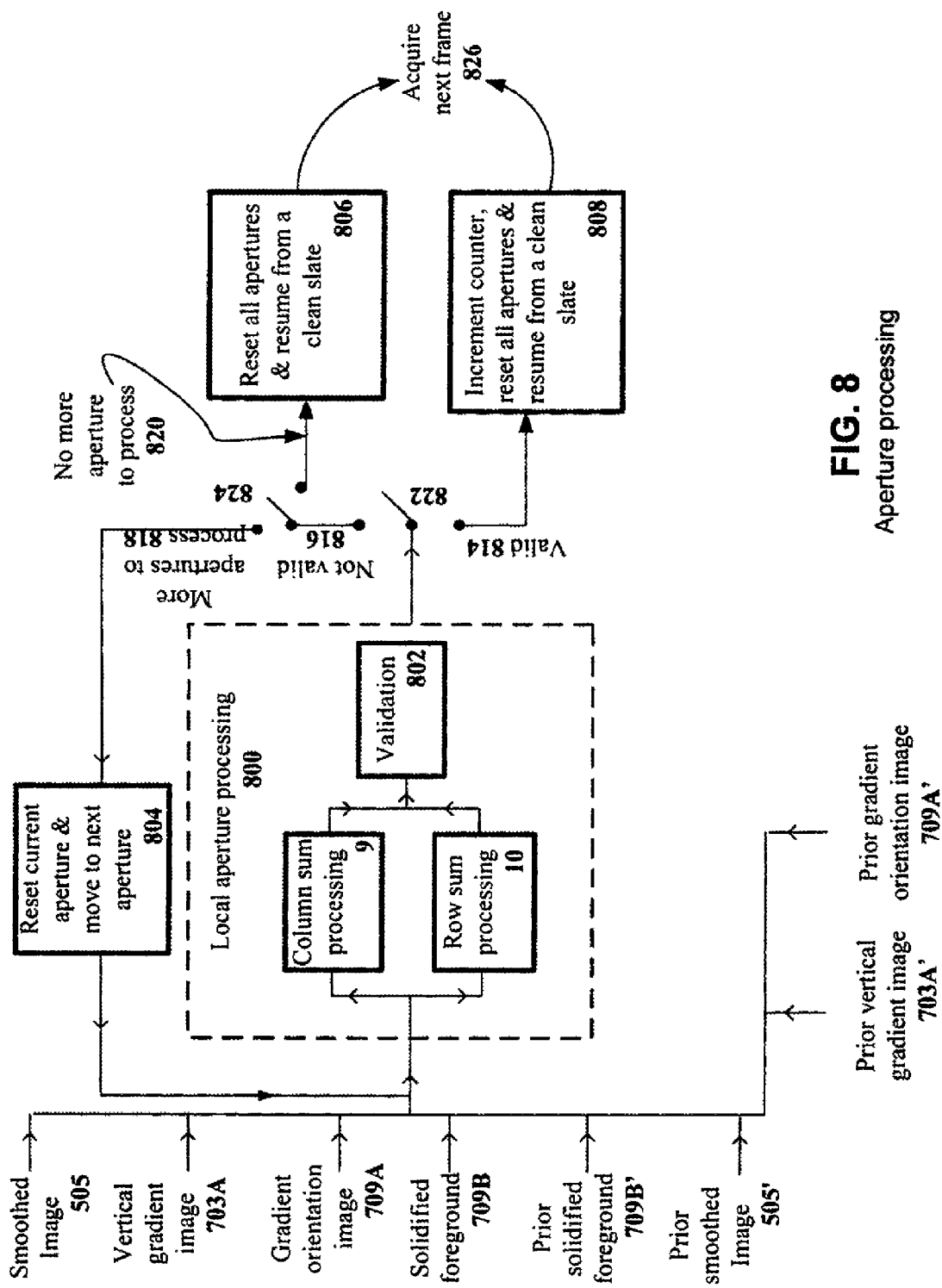
FIG. 8 shows the functional block diagram of the aperture processing. 822 and 824 signify two two-way switches which flip to one side based on the preceding operation, namely the local aperture processing 800 in the case of 822 and whether more apertures remain to be processed in the case of 824.
Figure 9:
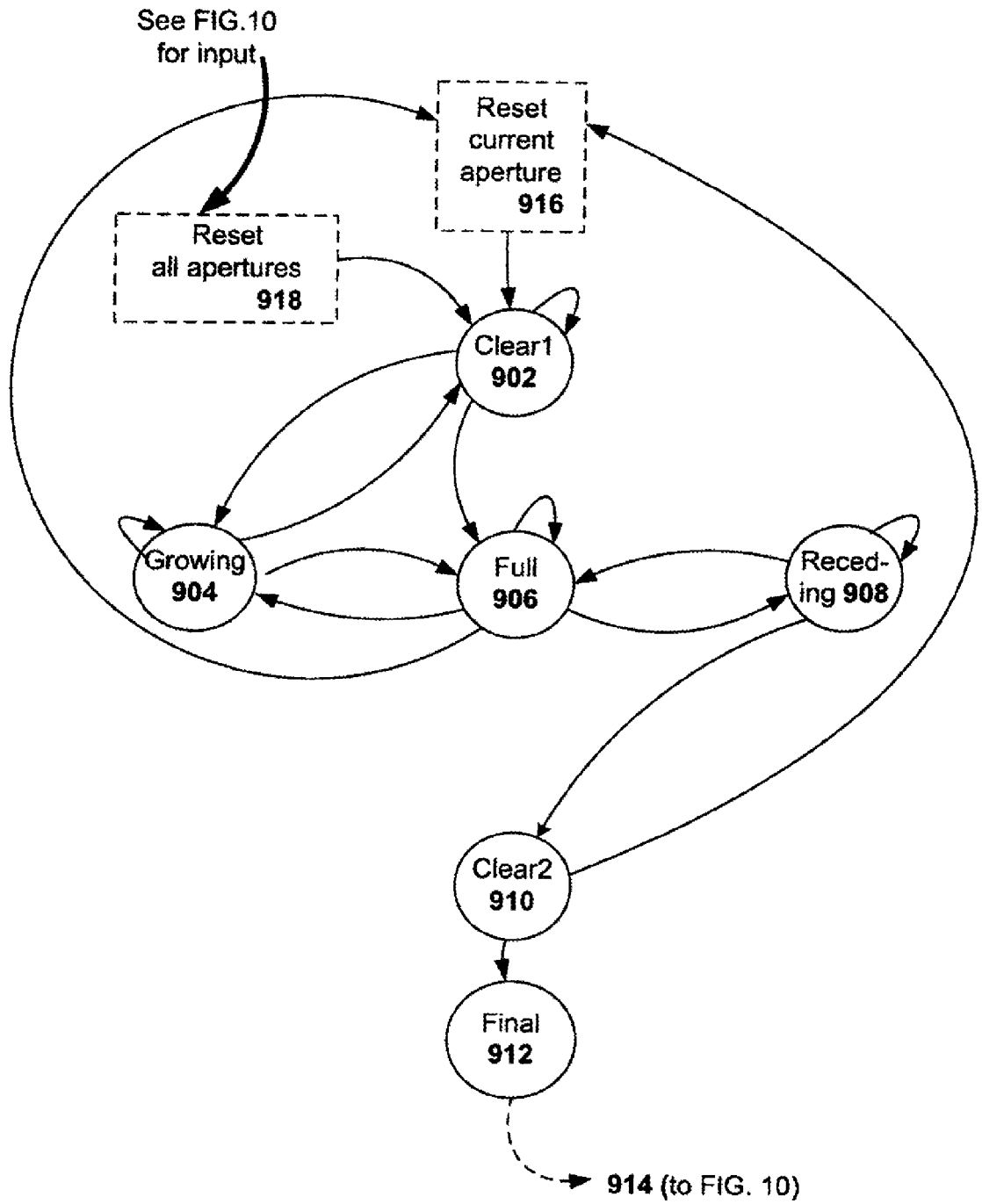
FIG. 9 illustrates the states of the column sum processing along with the permissible transitions in it in context of a state diagram. Circles in this depiction represent state such as 1004 in FIG. 10 while curved arrows represent inter-state and self transitions.
Figure 10:
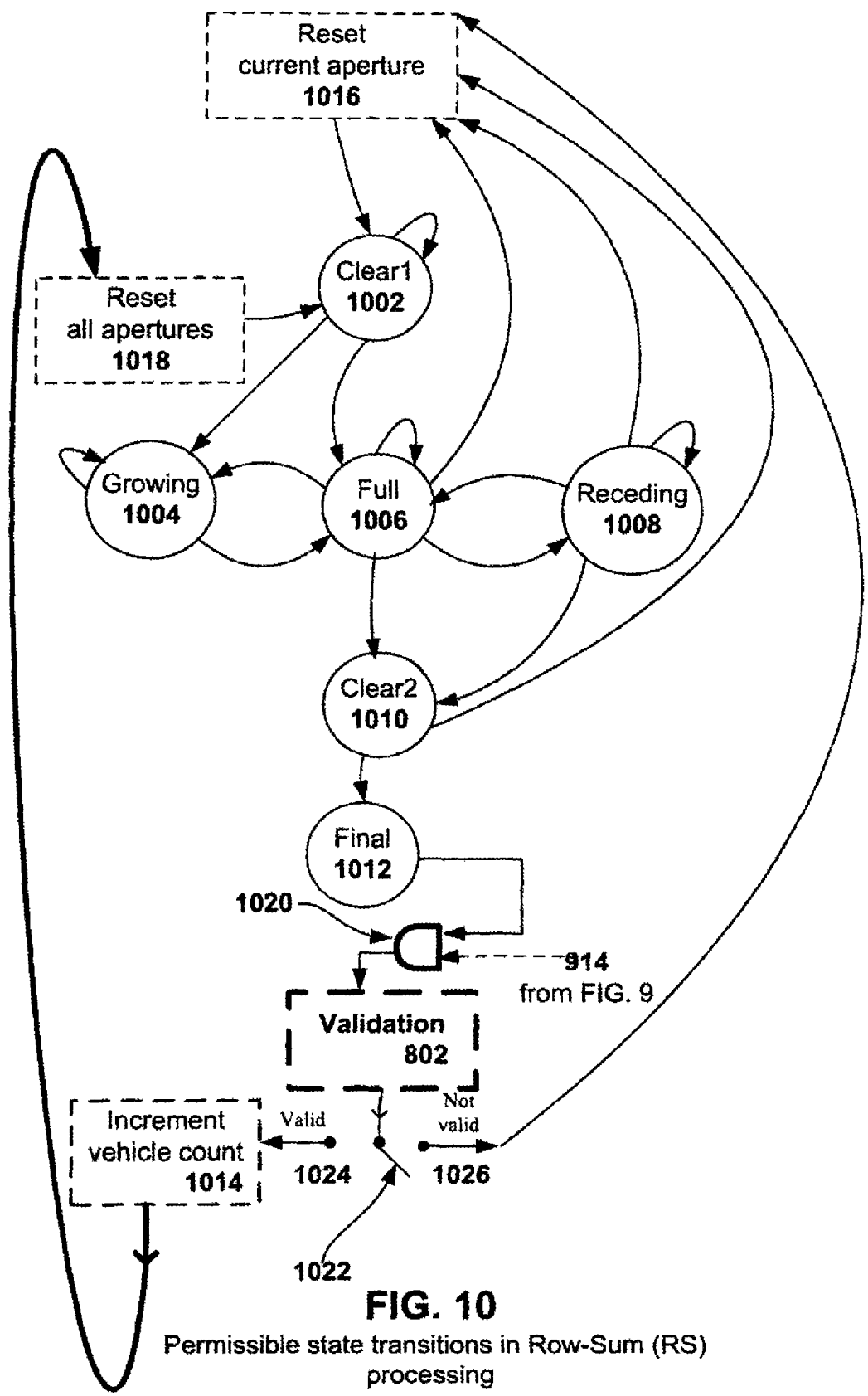
FIG. 10 illustrates the states of the row-sum processing along with the permissible transitions to/from those states.
Figure 10A:
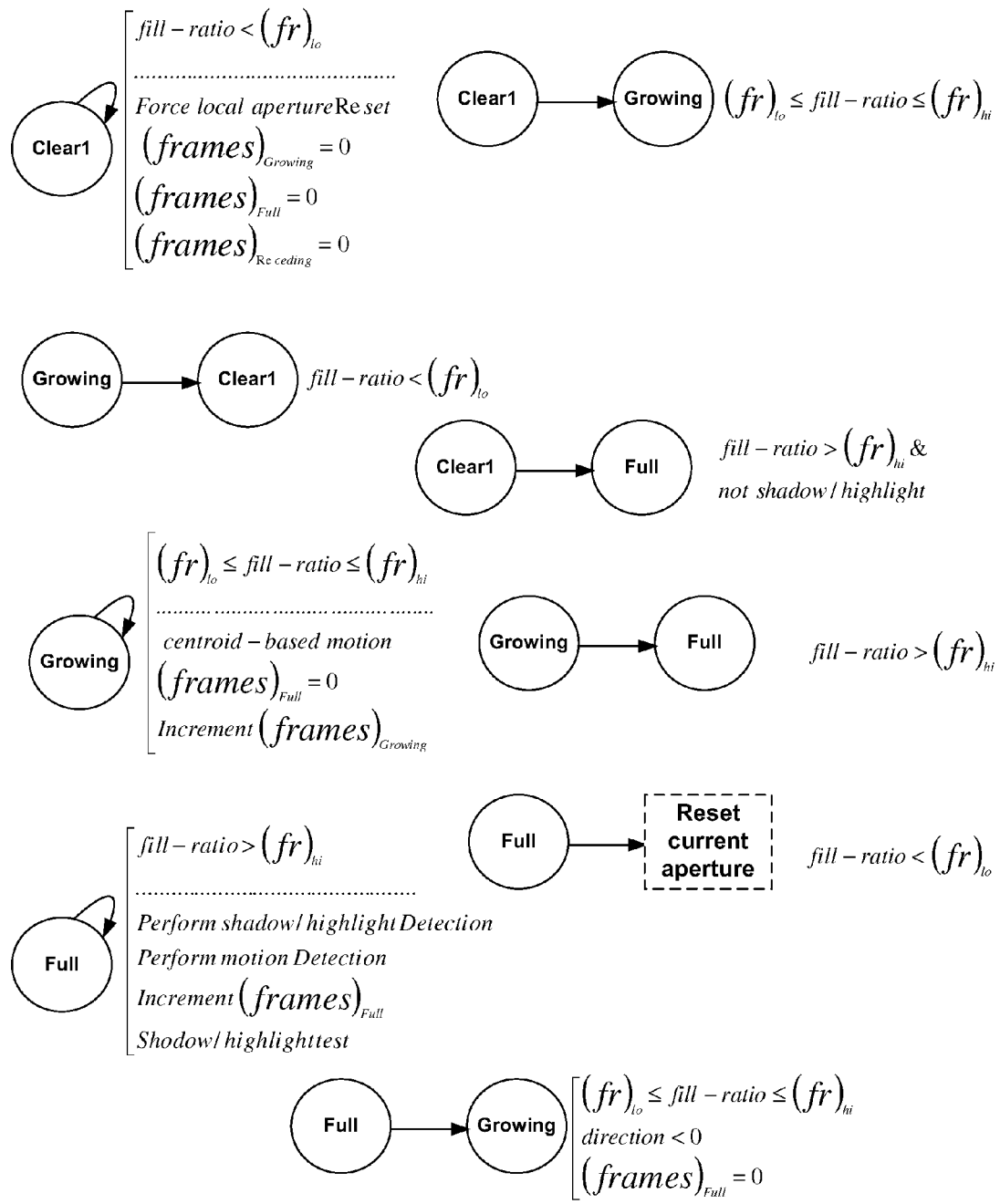
FIG. 10A illustrates the requisites for assuming a particular state and those for inter-state transitions in row-sum processing.

As evident from FIG. 8 Aperture Processing is the final stage of the vehicle counting process. It concludes either by adding to the vehicle count and resetting all apertures to start from a clean slate or only resetting, without incrementing the vehicle count, and starting from a clean slate for the respective instance of the sliding aperture—hereafter termed local aperture. FIG. 8 shows the principal stages of the Aperture Processing. Aperture processing itself rests on Local Aperture Processing. Local apertures are instances of the sliding aperture in the rectangular monitor zone, i.e. in the object space, when mapped onto image space and approximated by their inscribed rectangle, as depicted in 42 and 47, 48 in FIG. 4A and FIG. 4B. As evident from FIG. 8, step 800—Local Aperture Processing—comprises its two main constituent processes: the Column-Sum processing 9, and the Row-Sum processing 10, followed by a Validation step 802. As depicted in FIG. 8, FIG. 9 and FIG. 10, during aperture processing, every instance of the sliding aperture is processed sequentially from left to right. It should, however, be noted that processing local apertures in sequence from left to right is a matter of convenience and can be pursued randomly.

As described earlier, local apertures are instances of sliding apertures in object space after being mapped onto image space and approximated by their inscribed rectangle 47, 48.

Local Aperture Processing

Referring to functional block 800 of FIG. 8, in local aperture processing—the solidified foreground image within each thus derived inscribed rectangle—i.e. each aperture—is viewed as a 0-1 matrix of m rows and n columns. Said 0-1 matrix is then decomposed into its orthogonal projections, namely the row-sum vector RS and the column-sum vector CS whose definitions appears below:

$$\vec{RS} = [rs_1 \ \ldots \ rs_m] \quad (3)$$

where [ ]' signifies vector transpose and $rs_i = \sum_{j=1}^{n} a_{ij}$ $$\vec{CS} = [cs_1 \ \ldots \ cs_n] \quad (4)$$

where $cs_j = \sum_{i=1}^{m} a_{ij}$

As described later, both column-sum and row-sum processing need to transit through multiple states to conclude a vehicle count. The column-sum and row-sum processing progress in an intertwined manner. Transition from one state to another is only effected across frames, subject to additional provisos to be addressed. In the preferred embodiment, with the arrival of each frame, local apertures are scanned sequentially from closest to farthest from the camera. It is noteworthy that local apertures can be scanned and processed in different orders without departing from the methodology of the present invention.

It is emphasized here that viewing and processing the foreground image in context of its projections has been pursued for its convenience and tractability and as apparent to any one skilled in the art the foreground image could have been processed directly and yet without departure from the methodology offered by the present invention. What is significant in this respect is pursuing segmentation in context of the sliding aperture in spatiotemporal space only to the extent necessary.

Column-Sum Processing

Referring As a first step the column-sum vector is subjected to a noise suppression operation, which entails suppressing elements that are less than a predefined percentage of the local aperture height. Noise suppression, further suppresses isolated elements—irrespective of their value—of the column sum vector. Isolated elements are those with adjacent O-elements.

Column-sum processing is pursued in context of a multi-state transitory operation, as shown in FIG. 9. The prime mover in bringing about state changes is the fill ratio. There are, however, other factors that affect inter-state transition also, which remain to be addressed. Fill ratio is the ratio of the sum of the elements of the column sum vector after noise suppression to the number of pixels claimed by the respective aperture:

$$\text{fill-ratio}_{cs} = \frac{\sum_{j=1}^{n} \vec{cs}_j}{m \cdot n} \quad \text{with } \vec{cs}_j \mid j = 1 \ldots n$$

denoting the noise suppressed elements of $\vec{CS}$ m and n above, denote the local aperture height and width in pixel. There are two user defined thresholds that qualify fill-ratios for various state transitions in the manner shown. The thresholds are, viz:
1) $(fr)_{lo}$; and 2) $(fr)_{hi}$
The fill-ratio requirements for different states, in terms of above thresholds, are delineated below.

$$\text{state} = \begin{cases} \text{Clear1} & \text{if} \quad \text{fill-ratio} < (fr)_{lo} \\ \text{Growing} & \text{if} \quad (fr)_{lo} \leq \text{fill-ratio} \leq (fr)_{hi} \\ \text{Full} & \text{if} \quad \text{fill-ratio} > (fr)_{hi} \\ \text{Growing} & \text{if} \quad (fr)_{lo} \leq \text{fill-ratio} \leq (fr)_{hi} \\ \text{Clear2} & \text{if} \quad \text{fill-ratio} < (fr)_{lo} \end{cases} \quad (5)$$

Figure 9A:
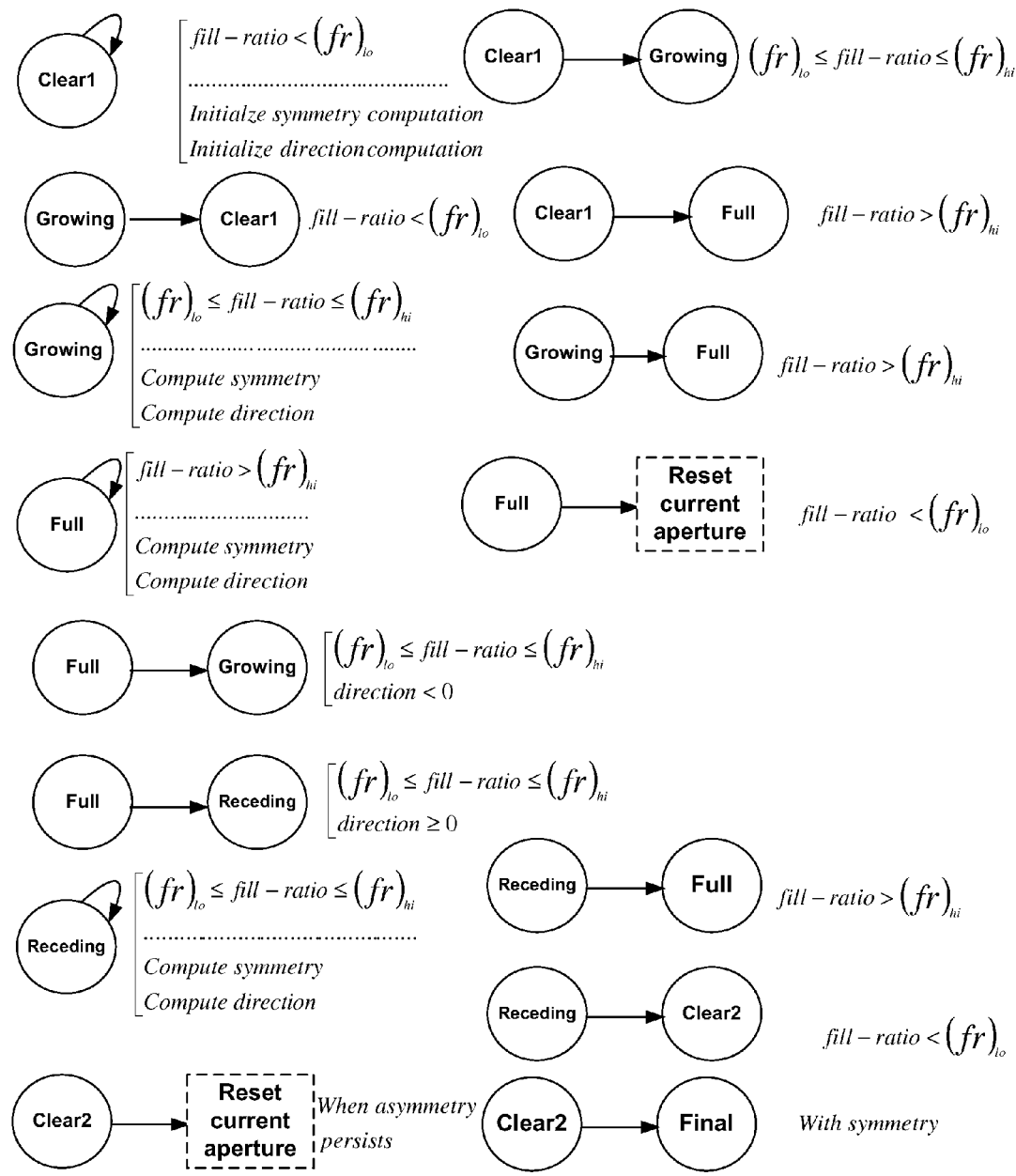
FIG. 9A illustrates the requisites for assuming a particular state as well as operations performed in those states along with the conditions to be met for various state transitions during column-sum processing.

It is emphasized that there may be other conditions beyond those specified in (5), above, to effect a state transition as detailed in FIG. 9A.

Column-sum processing entails 6 states in total. FIG. 9 illustrates the permissible state transitions during the column-sum processing. Once the requisites are met, the state transition is effected with the arrival of the subsequent video frame. Vehicle count cannot be incremented without column-sum processing reaching its conclusive stage, i.e. the Final state. Even then, row-sum processing must also conclude satisfactorily for the vehicle count to be incremented. As illustrated in FIG. 9 it is imperative that column-sum processing transit at least through the Clear1, Full and Clear2 states to conclude column-sum processing. Again, as evident from FIG. 9, other routes that additionally include visiting the Growing and/or the Receding states also constitute viable routes for satisfactory conclusion of column-sum processing needed to increment vehicle count.

There are two attributes that are computed in the course of column processing: 1) symmetry; and 2) direction—i.e. motion direction. The first is intended to disqualify apertures that are not filled symmetrically by the foreground pixels, while the second is concerned with disqualifying a local aperture based on motion direction: moving in opposite direction disqualifies an object from being counted and is cause enough to lead to the resetting the associated aperture.

Symmetry

The purpose of computing symmetry is to conclude abruptly column-sum processing and thence reset the aperture in which the foreground pixels (observed through the associated column-sum vector) are not evenly distributed across the width of the aperture, as the object advances through the Growing, Full and Receding states. A vehicle by virtue of its shape and size is expected to exhibit such symmetry at least within one instance of the sliding aperture. To this end the following attributes are computed:

$$\text{left-sum} = \sum_{i=1}^{n/2} cs_j \qquad \text{right-sum} = \sum_{i=n/2+1}^{n} cs_j$$

$$\text{left-span} = \sum_{i=1}^{n/2} \text{sgn}(cs_j) \quad \text{right-span} = \sum_{i=n/2+1}^{n} \text{sgn}(cs_j)$$

where sgn( ) represents the signum function and in turn the following attributes are derived from then:

$$\text{span-symmetry} = \frac{2 \cdot \min(\text{left-span}, \text{right-span})}{\text{left-span} + \text{right-span}}$$

$$\text{sum-symmetry} = \frac{2 \cdot \min(\text{left-sum}, \text{right-sum})}{\text{left-sum} + \text{right-sum}}$$

and eventually symmetry = min(span-symmetry, sum-symmetry)

In the preferred embodiment a recursive mean is computed for thus defined symmetry. This quantity is then gauged against a minimum acceptable threshold, and when not met a reset of the respective aperture is forced.

In yet another embodiments of the present invention symmetry is gauged through span-symmetry much like sum-symmetry, individually as described above.

Symmetry, across the width of a local aperture, can be gauged through other routes such as computing skewness However, it is understood that it will be obvious to one skilled in the art that all such obvious modifications are intended to be within the scope of the invention.

After a reset the column-sum process enters the Clear1 state. If the fill-ratio remains below a predefined low threshold the state will remain unchanged in the next frame. As shown in FIG. 9, this state can be maintained as long as the fill-ratio does not dictate otherwise. When the fill-ratio is above a high predefined threshold the state transits to the Full state directly. When in Full state and the fill ratio is in between the two said thresholds, the destination state becomes either Growing or Receding, based on the inferred underlying direction of motion. Namely, when motion direction is compatible with the expected direction of flow the state transits from Full to Growing, otherwise it transits to the Receding state—See FIG. 9 and FIG. 9A for permissible state transitions and associated condition and critical operations performed.

Motion Direction Indicator

The motivation for establishing motion direction during column-sum processing is to disambiguate state transition from the Full state to either Growing or Receding when the fill-ratio dictates it. As illustrated in FIG. 9 the state is liable to transit either way: Growing or Receding.

Motion direction during column processing is pursued only at Growing and Receding states, and entails computation of a mean recursively. The result is used only in the Full state and only when the fill-ratio reduces to the point of requiring transition to either Growing or Receding state.

Column-sum motion direction or cs-direction is determined as follows:

$$\text{lead-}cs = \sum_{i=m/2}^{m} rs_i$$

$$\text{trail-}cs = \sum_{i=1}^{m/2} rs_i$$

$rs_i$ is as defined earlier.

$$cs\text{-direction} = \begin{cases} 1 & \text{if lead-}cs > \text{tail-}cs \\ -1 & \text{else} \end{cases}$$

cs-direction is averaged recursively and when the resultant mean is positive the Receding state will be the destination state as opposed to the Growing state and vice-versa, when this attribute is examined while in Full state and the associated fill-ratio descends requiring departure from the Full state. In this way the direction of state transition from Full state to either Growing or Receding state is disambiguated.

In yet another embodiment of the present invention only examination of cs-direction at Full state and subsequently when the fill-ratio descends to warrant transition to either Growing or Receding state disambiguates the transition path.

FIG. 9A illustrates the requisite for assuming a particular state as well as operations performed in those states along with the conditions to be met for various state transitions.

Row-Sum Processing

Much like column processing, at the outset, the row-sum vector is subjected to a noise suppression operation, which suppresses elements that are less than a predefined percentage of the local aperture width. Noise suppression, further suppresses isolated elements of the row-sum vector.

Row-sum processing is pursued in context of a multistate transitory operation, as shown in FIG. 10. The prime mover in bringing about state changes is the fill-ratio. There are, however, other factors that affect inter-state transition also, which remain to be addressed. fill-ratio is the ratio of the sum of the elements of the row-sum vector after noise suppression to the number of pixels claimed by the respective aperture as specified below:

$$\text{fill-ratio}_{rs} = \frac{\sum_{i=1}^{m} \vec{rs}_i}{m \cdot n} \text{ with}$$

$\vec{rs}_i^{|i=1...m}$ denoting the noise suppressed elements of $\vec{RS}$

The fill-ratio requirements for different states are similar to those delineated for column-sum processing earlier.

As depicted in FIG. 10, row-sum processing begins with the Clear1 state and ends at the Clear2 state where either the aperture resets or concludes towards the Final state and eventually the validation stage—step 802 in FIG. 8. Successful validation increments the vehicle count.

In the course of row-sum processing several attributes are computed which in conjunction with fill-ratio effect state transition. The object of computing these attributes is to determine motion direction, enabling speed estimation, and in turn preventing opposing vehicles and non-vehicular objects from being counted. To this end, the following attributes are computed: 1) shadow/highlight; 2) Motion Shadow/Highlight Stationary shadows/highlights are not of concern, as they get absorbed into the adaptive background, as described earlier. But, moving cast shadows/highlights need to be accounted for. To this end this invention presents two new shadow and highlight detectors. Both are grayscale-based; one uses the divergence between two populations of gradient orientation due to the incident frame and the prevailing background (i.e. two regions of interest) while the other exploits the difference in gradient orientation between corresponding point pairs of those regions. For ease of reference they are referred to as:

3) A Point-Wise Coordinate Insensitive Shadow/Highlight Detector (PWCISHD);
4) A Point-Wise Coordinate Sensitive Shadow/Highlight Detector (PWCSSHD);

Both are only attempted when the fill-ratio qualifies for the Full state during the row-sum processing. They both exploit the texture of the underlying background to determine whether the background in the local aperture is obscured by an object or shadow/highlight.

Said shadow-highlight detectors can be used independently to yield a verdict, but, in the preferred embodiment they are used jointly. When used jointly, one operates as the tiebreaker for the decision rendered by the other. The initial or the base detector assigns the incident local aperture to either of three classes of shadow/highlight, uncertain, or obscured by object. The other detector breaks the tie in instances when an uncertain verdict is rendered by said base detector.

PWCISHD

Figure 11:
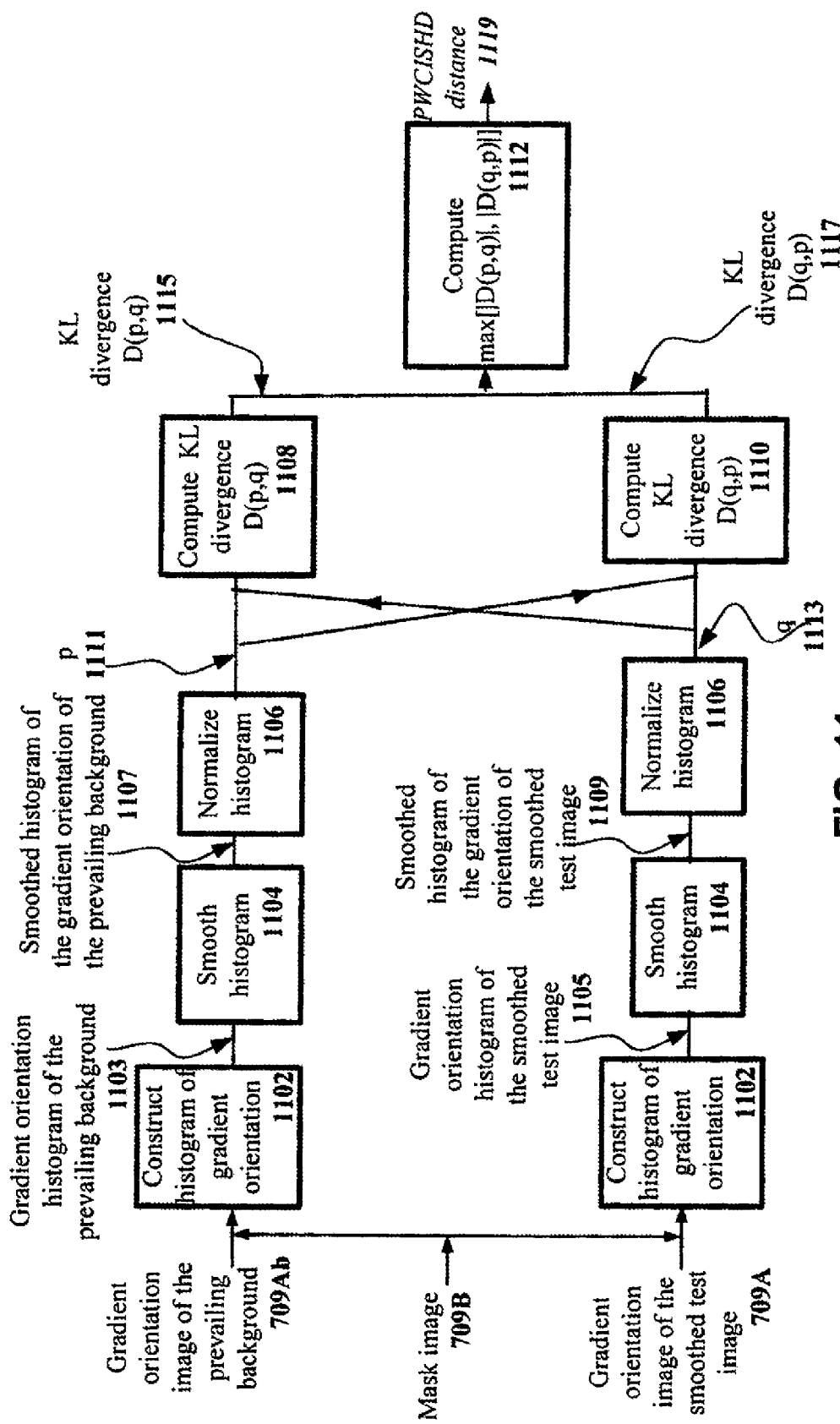
FIG. 11 shows the functional block diagram of the Point-Wise Coordinate-Insensitive Shadow or Highlight Detector, for ease of reference hereafter also referred to as PWCISHD.

FIG. 11 presents the functional block diagram of PWCISHD. This detector discriminates between a background that appears through shadow/highlight versus that obscured by an object, through a distance that is a variation of the known Kulback-Leibler directed divergence.

As depicted in FIG. 11, a dissimilarity distance—1119—forms the output of this detector. which in turn is derived from the divergences of p relative to q and q relative to p where p represents the density associated with the prevailing background and q is that due to the smoothed incident image, with the area of interest being confined to the respective local aperture and the sampling points being dictated by the solidified foreground acting as mask 709B.

The steps leading to computation of density p comprise constructing the histogram of the gradient orientation image of the prevailing background 709A_b—with the local aperture confining the area of interest and foreground pixels identifying the sampling points—through step 1102 and then smoothing thus found histogram through step 1104 and normalizing the smoothed histogram through step 1106. Similarly, through an identical sequence of steps a density q is derived from the gradient orientation of the smoothed incident image. Once p and q are at hand two relative divergences D(p,q) and D(q,p) are computed as follows through steps 1108 and 1110 of FIG. 11.

$$D(p, q) = \sum_p \log_2\left(\frac{p}{q}\right)$$

$$D(p, q) = \sum_q \log_2\left(\frac{p}{q}\right)$$

Once the above relative distances are determined, the following distance is computed through step 1112 to quantify dissimilarity between the prevailing background and the test image within the local aperture of concern:

$$D_{PWCISHD} = \max[|D(p,q)|, |D(q,p)|]$$

PWCSSHD

Figure 12:
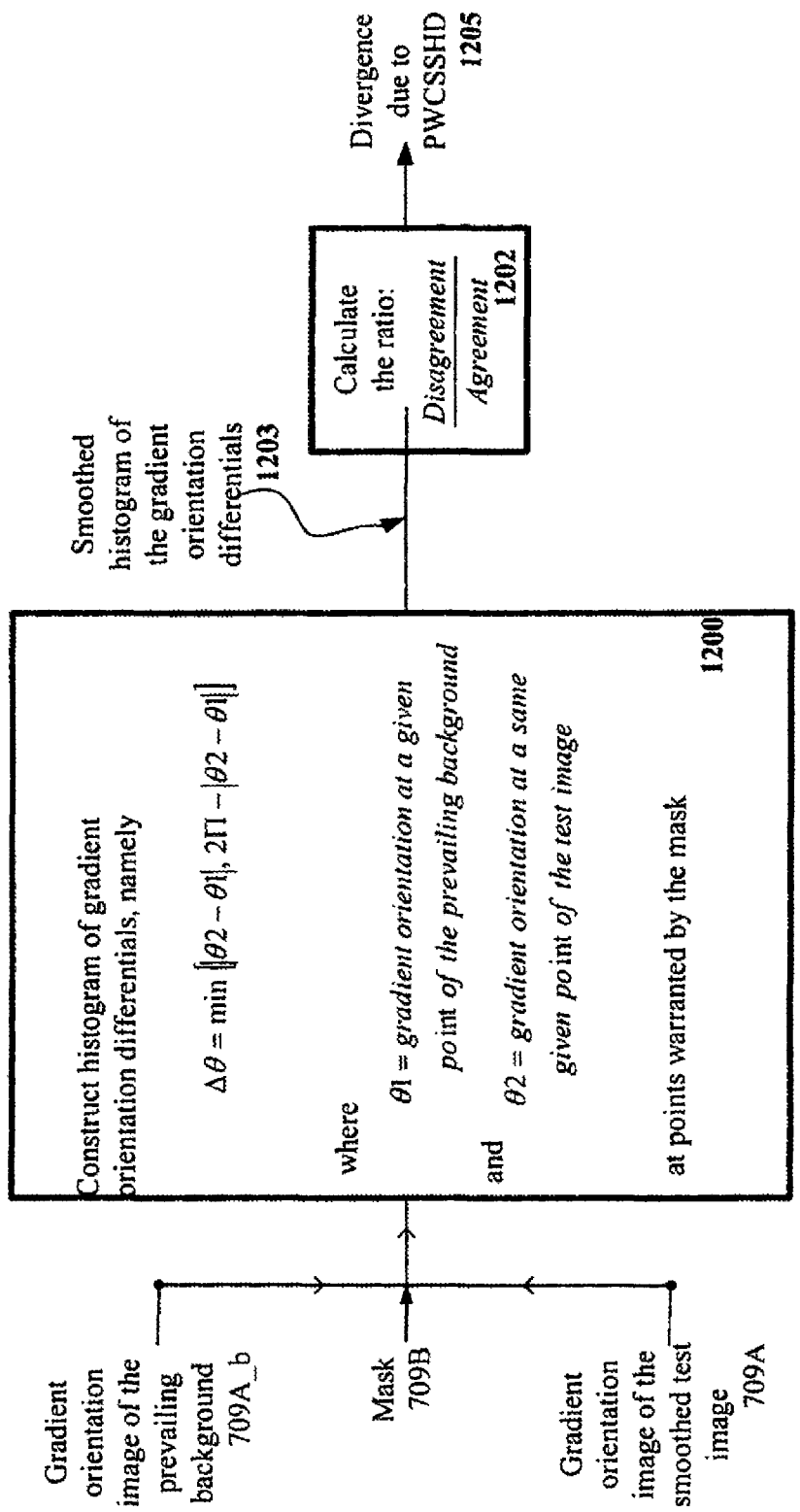
FIG. 12 shows the functional block diagram of Point-Wise Coordinate-Sensitive moving cast Shadow or Highlight Detector, for ease of reference hereafter also referred to as PWCSSHD.

FIG. 12 presents the functional block diagram of PWCSSHD. This detector much like the one before—i.e. PWCISHD—discriminates between a background that appears through shadow/highlight versus that obscured by an object using a distance described below.

Referring to FIG. 12, through step 1200 a histogram of gradient orientation differentials, $\Delta\theta$, is constructed according to:

$$\Delta\theta = \min(|\theta_2 - \theta_1|, 2\Pi - |\theta_2 - \theta_1|)$$

where $\theta_1$ = gradient orientation at a given point of the prevailing background and $\theta_2$ = gradient orientation at the same given coordinates as above of the test image with the proviso that when $\Delta\theta > 0$ and either $\theta_1$ or $\theta_2$ remain undefined, then $\Delta\theta$ = a pre-assigned penalty differential. Such situations arise when the gradient magnitude at the image point of concern descends below a level to warrant computing gradient orientation, as discussed earlier. The histogram bins start at bin 0 and assume a bin size equal to that of the granularity with which gradient orientation is computed for data inputs 709A and 709A_b.

Ultimately, through step 1202, a dissimilarity distance is computed according to:

$$D_{PWCSSHD} = \frac{\text{Disagrrement}}{\text{Agreement}} = \frac{\sum_{k=1}^{K} b_k \cdot bw_k \cdot f_k}{f_0}$$

where $b_k$ = bin number $k$ $bw_k$ = bin width $f_k$ = frequency at bin number $k$ Counting vehicles in presence of moving shadow/highlight is at times accompanied by fill-ratios indicative of consistent Full states. Such instances are unraveled through expecting a minimum count of consecutive shadow/highlight plus a minimum number of non-shadow/non-highlight frames followed by minimum number of shadow/highlight frames.

Motion Detection & Speed Estimation

Several motion detection algorithms are in play in the present invention. Some are applied selectively based on the state for which fill-ratio qualifies for and some others are used in different embodiments of the present invention. Below they are addressed in context of states of row-sum processing Motion detectors applied at Growing & Receding states;

Motion detectors applied at Full state

Motion Detectors Applied at Growing & Receding States

In these states the centroid of the foreground pixels within the local aperture as seen through the row-sum vector is computed, according to $$ci_0 = \frac{\sum_{i=1}^{m} rs_i}{m}$$

with $rs_i$ representing the ith element of $\vec{RS}$.

and $ci_0$ representing said centroid coordinate (or centroid-index) only along the height of local aperture.

As evident from above, in this instance the interest is confined to only how far the centroid has advanced or receded along the height of the local aperture as opposed to movement along its width.

The above centroid-index is computed for the prior and current frames as long as their fill-ratio qualifies for the same states of Growing or Receding. A centroid-index differential is computed according to:

$$\Delta(ci_0) = (ci_0)_t - (ci_0)_{t-1}$$

where suffix t represents the current frame and t−1 the prior frame.

Thus found value of $\Delta(ci_0)$ is averaged recursively to yield a mean—$\mu\Delta(ci_0)$—and the result is used to establish direction of movement and in turn, in conjunction with fill-ratio, disambiguates or dictates state transition when warranted. More specifically a negative $\mu\Delta(ci_0)$ is viewed to be due to an object moving in the opposite direction and hence is cause enough to force a local aperture reset.

Motion Detectors Applied at Full State

Several motion detectors are disclosed in the present invention, in this category. Basically they exploit similarity between:

iv) the smoothed image pair in the current and prior frame within the local aperture of concern, where warranted by a mask—to be described;

v) the gradient orientation image pair in the current and prior frame within the local aperture of concern, where warranted by the same mask as in (i), above;

vi) the vertical gradient image pair in the current and prior frame within the local aperture of concern, where warranted by the same mask as in (i), above.

It is emphasized that the present invention adheres to the convention of viewing the direction of an edge element as being perpendicular to the edge itself and pointing to the side with higher intensity.

Mask Generation

Figure 13:
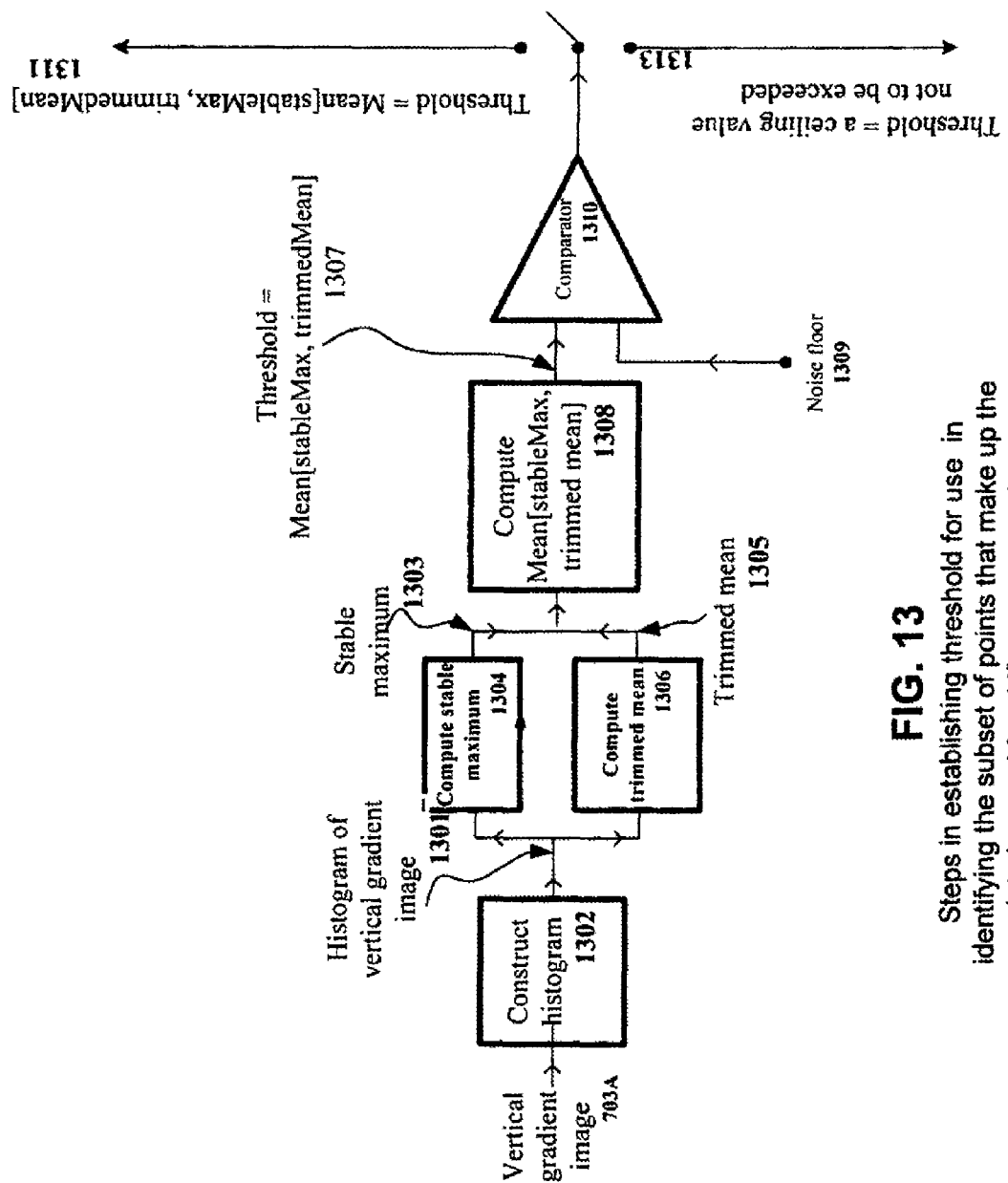
FIG. 13 shows the steps in establishing the thresholds for use in identifying the subset of points that make up the masks to be used for shift (displacement) computation between various image pairs.

Said mask in (i), above, is a binary image and, as illustrated in FIG. 13, is derived through the process of:

17) Constructing a histogram of the modulus of the value of the vertical gradient image pixels, for the region of interest;

18) Deriving a stable maximum for said histogram in (1), above, by computing the median of the samples which fall within a top predefined percentage of the population;

19) Deriving a trimmed mean for said histogram by ignoring a bottom low and high top predefined percentages of the underlying samples of the population;

20) Deriving a threshold from the mean of thus derived stable maximum and trimmed mean in (2) and (3) above;

21) If thus derived threshold in (4), above, descends below a user-defined noise floor, then raising said threshold in such a way to trump out any said value of the vertical gradient image pixel from exceeding said raised threshold;

22) Comparing the modulus of said vertical gradient image pixels with thus found threshold in steps (4) and (5) above, and when the value exceeds said threshold, set the corresponding pixel in a so called mask image otherwise clear that pixel coordinate, and in this fashion obtain the mask delineating the image coordinates of concern.

As mentioned earlier several motion detectors in this category are disclosed in the present invention. All of them share the known trait in which the similarity between an image pair or some variation of an image pair with one being due to the prior frame and the other due to the current frame is exploited at different shifts—i.e. displacements—between them along the height of the respective local aperture—i.e. in one axis. The novel aspect of the methods presented herein rests either in the way the subset of points from each image of the image pair are selected for participation in said similarity/dissimilarity determination effort or the metric or method used in quantifying similarity or dissimilarity. It should be remembered that the operations involved here are all confined to the local aperture of concern.

Figure 14:
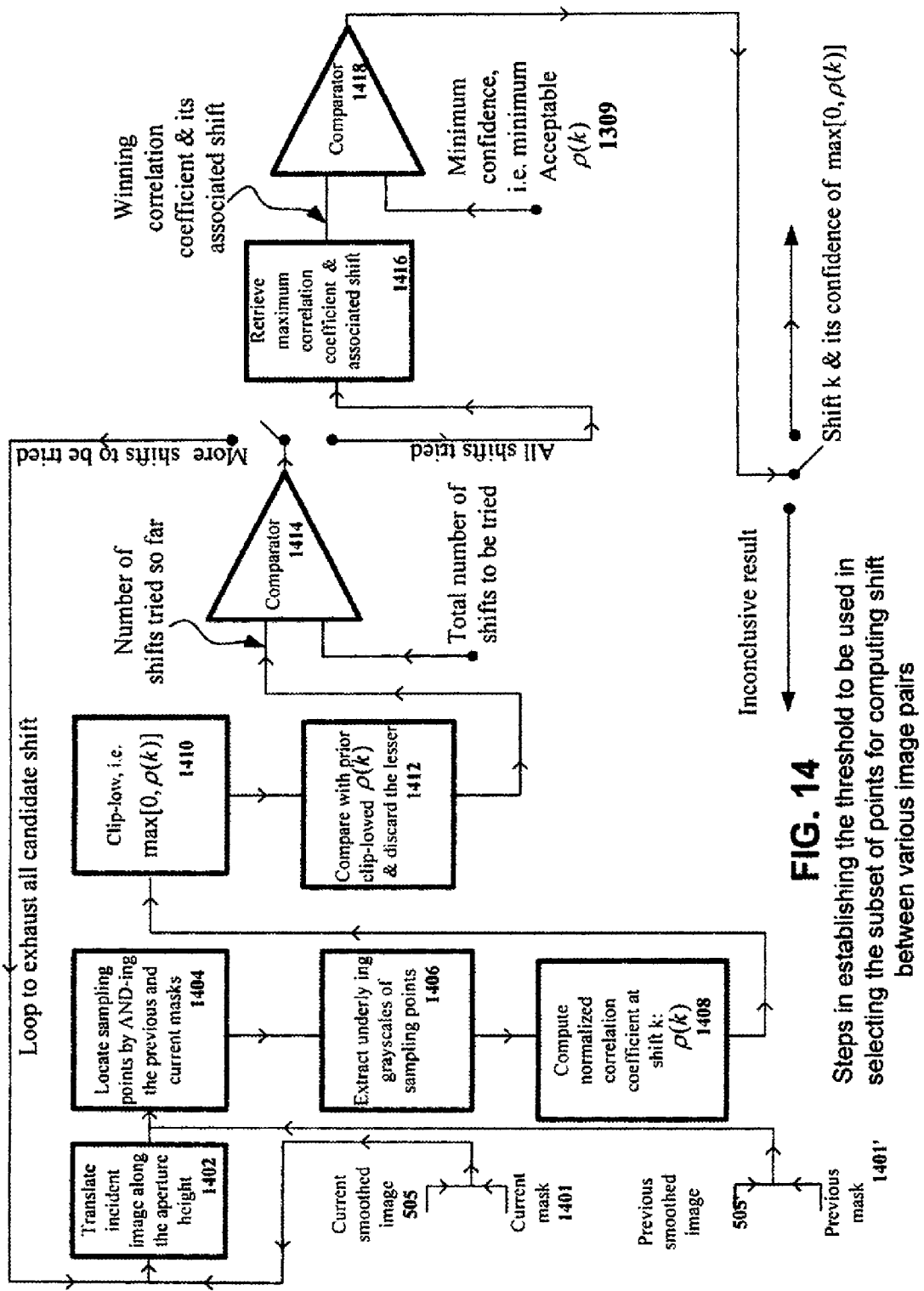
FIG. 14 illustrates the steps of detecting the inter-frame shift (displacement) through a normalized correlation-based operation between the smoothed images of the current and prior frames with the participating grayscales being pixel coordinates sanctioned by their accompanying masks.

In the preferred embodiment masks are constructed for the prior and current smooth images, as described above and depicted in FIG. 13. The current smooth image and its associated mask are shifted incrementally, over a range that covers expected positive and negative shifts between the two image pairs, and at each increment the grayscales of the corresponding points of the prior and current smoothed images are subjected to a normalized correlation operation subject to being sanctioned by both of their masks, as depicted in FIG. 14. Said two masks are AND-ed to yield the mask which identifies the participating points.

The normalized correlation operation at each incremental shift yields a correlation coefficient $\rho(k)$ where k denotes the shift along the height of the aperture. Said correlation coefficient has range of −1 to +1, however, for all intents and purposes it can be low-clipped at 0, namely subjected to $\max[0,\rho(k)]$ operation, as depicted in FIG. 14. $\rho(k)$ is viewed as confidence in the associated shift between prior and current frame smoothed grayscale images. FIG. 14 depicts the various stages at extracting the desired shift. Hence, in this fashion the inter-frame shift in pixels during non-shadow/highlight Full states where each shift is accompanied by a confidence, a weighted mean for the resulting shifts associated with each frame is computed with the confidences acting as the weights according to:

$$k_o = \frac{\sum_{f=1}^{F} \rho_f \cdot k_f}{\sum_{f=1}^{F} \rho_f}$$

where $k_o$ denotes the weighted mean of attained shifts associated with an apparent passing object, hereafter termed the aggregate shift and $k_f$ denotes the shift associated with frame f and $\rho_f$ denotes the confidence associated with said shift $k_f$.

Figure 15:
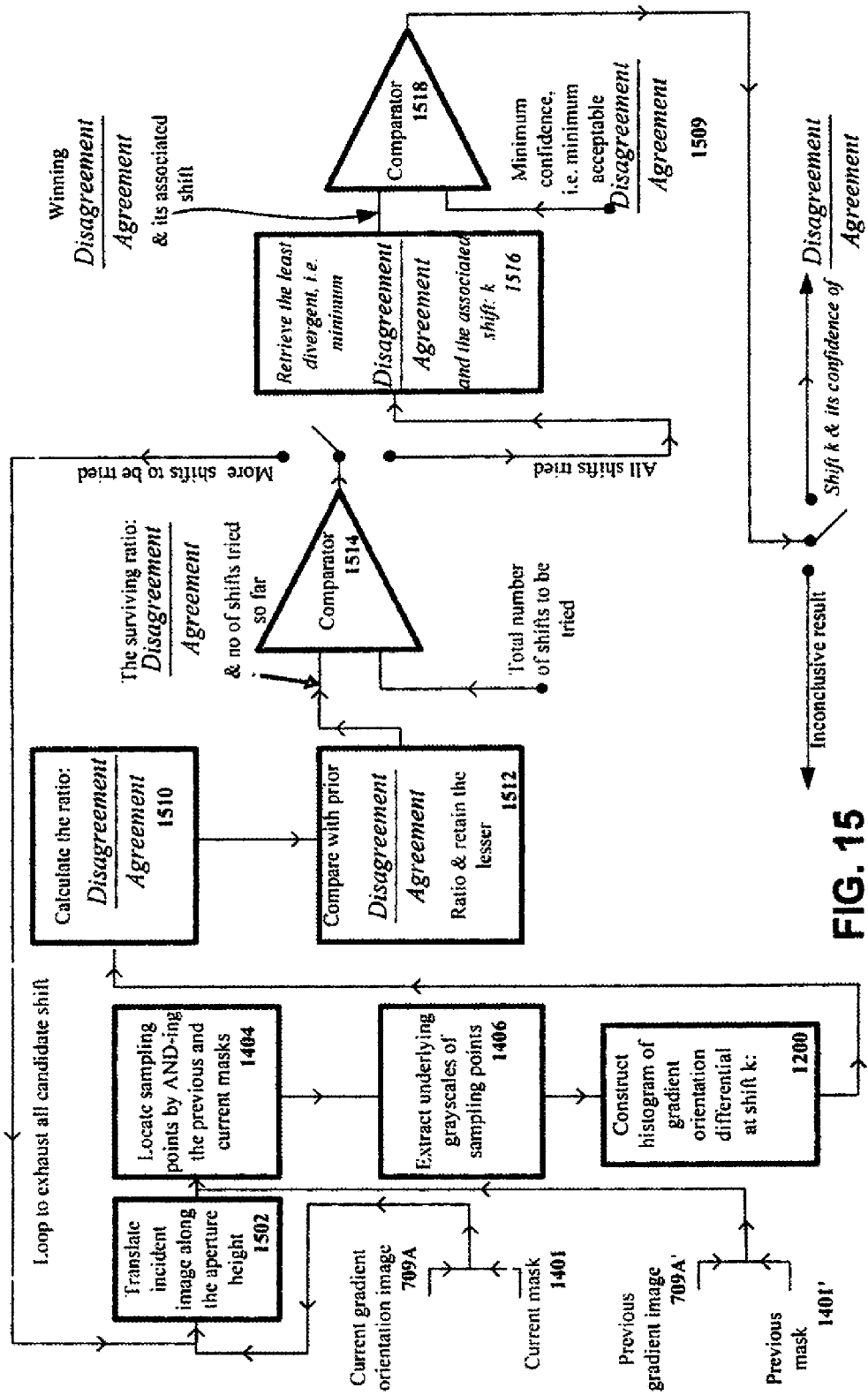
FIG. 15 illustrates steps involved in computing the displacement between the current and prior gradient orientation image pair along with their respective masks exhibiting maximum similarity

FIG. 15 depicts yet another method of detecting the shifts between the prior and current frame. In this instance the image pair, instead of being the smoothed image pair are the gradient orientation image pair of the previous and current frame. The same masks as before, i.e. those shown in FIG. 14, are used in conjunction with their respective gradient orientation image, however, instead of the earlier used normalized correlation scheme, the least divergent or least distant image pairs, with the distance being computed as shown and described through step 1202 of FIG. 12. The steps are also depicted in FIG. 15.

A similar aggregate shift to $k_o$, above, is computed for the resultant inter-frame-based shifts by computing the median of all the resultant shifts for the frames encountered in the course of the respective local aperture processing.

In yet another embodiment of the present invention the shift between current and prior frame is measured much like that depicted in FIG. 15 with the exception of the gradient orientation images giving their place to the vertical gradient images.

Validation

As evident from FIG. 10, when column-sum and row-sum processing conclude in favor of incrementing the vehicle count a validation step, 802 is entered. In the course of validation the object length is computed and when lesser than the minimal expected value for a vehicle, the current aperture is reset otherwise a speed is estimated to accompany the signal to increment the vehicle count. Again as evident from FIG. 10, incrementing the vehicle count is followed by resetting all apertures. The processing that yields the object-length and estimates speed proceeds as follows:

$$(\text{frames})_{total} = 2 \cdot \min\lfloor(\text{frames})_{Growing}, (\text{frames})_{Receding}\rfloor + (\text{frames})_{Full}$$

$$(objectlength) = (\text{frames})_{total} \cdot \frac{k_o}{m} \cdot (Ap)_h$$

Where $k_o$ is the aggregate shift yielded by any of the motion detection schemes described earlier and depicted in FIG. 14 or 15 and is in pixels per frame and m is the aperture height in pixels and $(Ap)_h$ is the aperture height in unit length.

Vehicle speed is estimated through:

$$\text{speed} = \frac{(objectlength) \cdot (\text{frame rate})}{(\text{frames})_{total}}$$

What is claimed is:

1. A method of counting vehicles in a road, the method comprising:
    producing a video stream of the road;
    processing the video stream to model a prevailing background model of the road;
    deriving a smoothed incident image of the road;
    performing a first detection process comprising:
        computing a gradient orientation of the prevailing background model and a gradient orientation of the smoothed incident image;
        constructing, smoothing, and normalizing histograms for the gradient orientations of the prevailing background model and the smoothed incident image to arrive at two density functions;
        deriving two directional divergences from the density functions; and
        comparing the directional divergences to determine a greater directional divergence between the smoothed incident image and the prevailing background model;
    performing a second detection process comprising:

computing gradient orientation differentials of the prevailing background model and the smoothed incident image at respective pixel coordinates;

constructing a histogram of the gradient orientation differentials, the histogram having numbered bins, each bin having a frequency and corresponding to a successively larger gradient orientation differential;

smoothing the histogram; and deriving a ratio of a sum of products of all bin numbers upwards of and including a first bin and respective frequencies to the frequency at a zeroth bin to determine a dissimilarity distance between the smoothed incident image and the prevailing background model;

detecting an object in response to the greater directional divergence determined from the first detection process being greater than a first threshold;

detecting the object in response to the dissimilarity difference determined by the second detection process being greater than a second threshold; and altering a vehicle count in response to detecting the object.

2. The method of claim 1, further comprising detecting motion of the object between a current frame and a prior frame of the video stream, wherein the step of detecting motion includes:

suppressing noise in the current and prior frames;

masking the prior and current frames; and subjecting the prior and current frames to a normalized correlation operation so as to determine a shift between the prior and current frames, the shift indicating motion of the object.

3. A method of counting vehicles in a road, the method comprising:

producing a video stream of the road;

processing the video stream to model a prevailing background model of the road;

deriving a smoothed incident image of the road;

performing aperture processing on the prevailing background model and the smoothed incident image so as to detect an object in the video stream;

wherein the step of performing aperture processing includes: constructing a binary matrix from the prevailing background model and the smoothed incident image; decomposing the binary matrix into a row sum vector and a column sum vector; determining a fill ratio of each of the row sum and column sum vectors; assigning a state corresponding to the fill ratio of each of the row sum and column sum vectors; changing the state in response to the fill ratio of each of the row sum and column sum vectors changing with time; detecting the object in the video stream in response to the state changing;

altering a vehicle count in response to detection of the object in the video stream; and wherein the step of altering a vehicle count includes incrementing the vehicle count in response to the state changing from a clear state to a growing state to a full state to a receding state to the clear state.

4. The method of claim 3, wherein the step of altering a vehicle count includes validating the detection of the object in the video stream as detection of a vehicle.

5. The method of claim 4, wherein the step of validating the detection of the object further includes: computing a length of the object; negating the detection of the object in response to the length being less than a selected value; and affirming the detection of the object in response to the length being equal to or greater than the selected value.

6. The method of claim 3, wherein the step of changing the state further includes: determining a symmetry of each of the row sum and column sum vectors; and resetting the state in response to the row sum and column sum vectors lacking symmetry.

7. The method of claim 3, wherein the step of validating the detection of the object is performed when the state is the full state.

8. The method of claim 3, wherein: the clear state corresponds to the fill ratio being less than a low fill ratio threshold; the growing state corresponds to the fill ratio being greater than or equal to the low fill ratio and less than or equal to a high fill ratio; the full state corresponds to the fill ratio being greater than the high fill ratio threshold; and the receding state corresponds to the fill ratio being greater than or equal to the low fill ratio and less than or equal to the high fill ratio.

9. The method of claim 8, wherein: the growing state further corresponds to a one half of the row sum vector being greater than another half of the row sum vector; and the receding state further corresponds to the other half of the row sum vector being greater than the one half of the row sum vector.

10. A method of counting vehicles in a road, the method comprising:

producing a video stream of the road;

processing the video stream to model a prevailing background model of the road;

deriving a smoothed incident image of the road;

performing a first detection process to determine a directional divergence between the smoothed incident image and the prevailing background model;

performing a second detection process to determine a dissimilarity distance between the prevailing background model and the smoothed incident image;

detecting an object in response to the directional divergence determined from the first detection process being greater than a first threshold;

detecting the object in response to the dissimilarity difference determined by the second detection process being greater than a second threshold;

constructing a binary matrix from the prevailing background model and the smoothed incident image;

decomposing the binary matrix into a row sum vector and a column sum vector; determining a fill ratio of each of the row sum and column sum vectors;

assigning a state corresponding to the fill ratio of each of the row sum and column sum vectors;

changing the state in response to the respective fill ratio of each of the row sum and column sum vectors changing with time;

validating the detection of the object in response to the state changing;

altering a vehicle count in response to detection of the object; and wherein the step of altering the vehicle count includes incrementing the vehicle count in response to the state changing from a clear state to a growing state to a full state to a receding state to the clear state.

11. The method of claim 10, further comprising:

computing a length of the object; negating the detection of the object in response to the length being less than a selected value; and affirming the detection of the object in response to the length being equal to or greater than the selected value.

12. The method of claim 10, wherein the step of validating the detection of the object is performed when the state is the full state.

13. The method of claim 10, wherein:
the clear state corresponds to the fill ratio being less than a low fill ratio threshold;
the growing state corresponds to the fill ratio being greater than or equal to the low fill ratio and less than or equal to a high fill ratio;
the full state corresponds to the fill ratio being greater than the high fill ratio threshold; and
the receding state corresponds to the fill ratio being greater than or equal to the low fill ratio and less than or equal to the high fill ratio.

14. The method of claim 13, wherein:
the growing state further corresponds to a one half of the row sum vector being greater than another half of the row sum vector; and
the receding state further corresponds to the other half of the row sum vector being greater than the one half of the row sum vector.

* * * * *